(12) United States Patent
Fabien et al.

(10) Patent No.: US 11,327,314 B2
(45) Date of Patent: May 10, 2022

(54) SUPPRESSING COHERENCE ARTIFACTS AND OPTICAL INTERFERENCE IN DISPLAYS

(71) Applicant: Facebook Technologies, LLC, Menlo Park, CA (US)

(72) Inventors: Chloe Astrid Marie Fabien, Seattle, WA (US); Daniel Guenther Greif, Redmond, WA (US); Scott Charles McEldowney, Redmond, WA (US); Maxwell Parsons, Seattle, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 262 days.

(21) Appl. No.: 16/849,734

(22) Filed: Apr. 15, 2020

(65) Prior Publication Data

US 2021/0278669 A1 Sep. 9, 2021

Related U.S. Application Data

(60) Provisional application No. 62/984,580, filed on Mar. 3, 2020.

(51) Int. Cl.
*G02B 27/01* (2006.01)
*G02B 26/08* (2006.01)
*G02B 26/10* (2006.01)

(52) U.S. Cl.
CPC ...... *G02B 27/0172* (2013.01); *G02B 26/0833* (2013.01); *G02B 26/101* (2013.01); *G02B 2027/0118* (2013.01)

(58) Field of Classification Search
CPC ............... G02B 27/0172; G02B 27/48; G02B 26/0833; G02B 26/101; G02B 2027/0118
See application file for complete search history.

(56) References Cited

U.S. PATENT DOCUMENTS

| | | | |
|---|---|---|---|
| 10,557,994 B1* | 2/2020 | Lee | G02B 6/34 |
| 10,989,880 B2* | 4/2021 | Lee | G02B 27/0172 |
| 11,221,479 B2* | 1/2022 | Zhao | G02B 5/32 |
| 11,243,448 B2* | 2/2022 | Jamali | G02F 1/29 |
| 2020/0209484 A1* | 7/2020 | Lee | G02B 5/1809 |
| 2021/0088782 A1* | 3/2021 | Zhao | G02B 27/0068 |
| 2021/0231952 A1* | 7/2021 | Jamali | G02B 15/16 |
| 2021/0240051 A1* | 8/2021 | Jamali | G02F 1/29 |
| 2021/0278669 A1* | 9/2021 | Fabien | G02B 26/101 |

* cited by examiner

*Primary Examiner* — Andrew Jordan
(74) *Attorney, Agent, or Firm* — Pequignot + Myers; Matthew A. Pequignot

(57) ABSTRACT

A display device including a laser-based light engine is disclosed. Optical interference effects due to the coherent nature of a laser light source are mitigated by shortening a coherence length of the laser source. The coherence length shortening is achieved by at least one of the following: providing a multiple longitudinal mode laser source, pulsing a laser source to achieve spectral broadening, or providing multi-emitter laser source(s) with emission wavelength varying from emitter to emitter.

20 Claims, 19 Drawing Sheets

SUPPRESSING COHERENCE ARTIFACTS AND OPTICAL INTERFERENCE IN DISPLAYS

REFERENCE TO RELATED APPLICATION

The present application claims priority from U.S. Provisional Application No. 62/984,580, entitled "Suppressing Coherence Artifacts in Displays with Laser Light Sources", filed on Mar. 3, 2020 and incorporated herein by reference in its entirety.

TECHNICAL FIELD

The present disclosure relates to visual displays, and in particular to devices and methods for improving image quality and reducing artifacts in images generated by visual displays, e.g. as near-eye displays.

BACKGROUND

Head mounted displays (HMD), helmet mounted displays, near-eye displays (NED), and other visual display systems are being used increasingly for displaying virtual reality (VR) content, augmented reality (AR) content, mixed reality (MR) content, etc. Such displays are finding applications in diverse fields including entertainment, education, training and biomedical science, to name just a few examples. The displayed VR/AR/MR content can be three-dimensional (3D) to enhance the experience and to match virtual objects to real objects observed by the user.

Compact and energy-efficient components and modules are desired for head-mounted/near-eye display systems. Because a display of HMD or NED is usually worn on the head of a user, a large, bulky, unbalanced, battery-draining, and/or heavy display device would be cumbersome and may be uncomfortable for the user to wear. Miniature display/imaging devices may weight less, but may be prone to overheating due to a small heat dissipation area due to the small overall size of the miniature display/imaging devices.

BRIEF DESCRIPTION OF THE DRAWINGS

Exemplary embodiments will now be described in conjunction with the drawings, in which.

DETAILED DESCRIPTION

Figure 1:
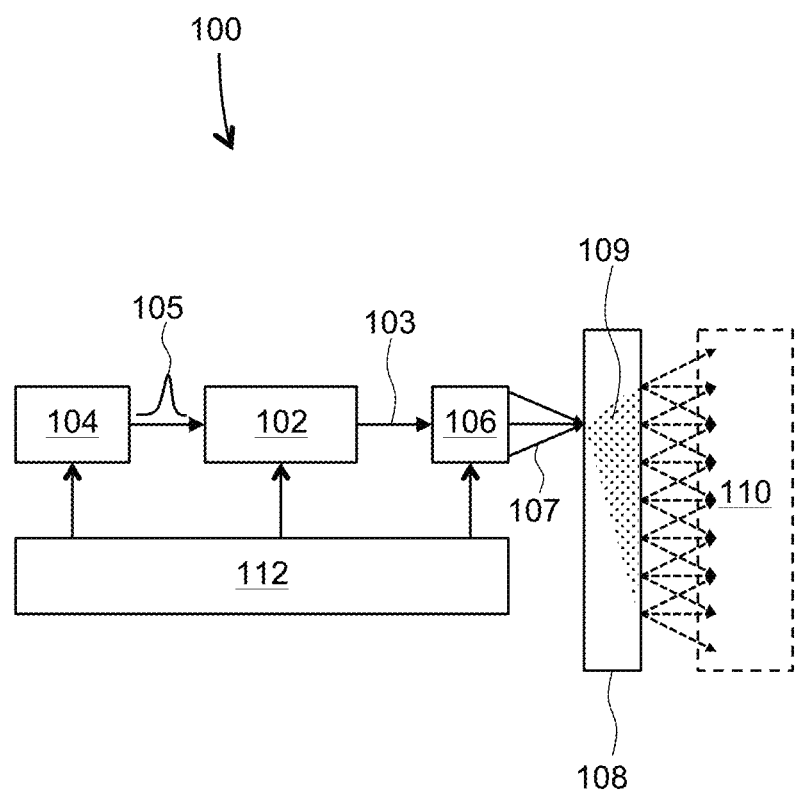
FIG. 1 is a schematic view of a display device of this disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1, 2, 3, 4A, 5A, 14A, 14B, and FIG. 15, similar reference numerals denote similar elements.

To avoid overheating of miniature display devices, display panels, projectors, etc., a high-efficiency light source or sources are preferable. Laser diode sources may provide a higher wall plug efficiency as compared to other types of light sources such as superluminescent light-emitting diodes (SLEDs) or light-emitting diodes (LEDs), for example. Laser sources, however, are known to produce image artifacts due to a coherent nature of light emitted by such sources. Image light, i.e. light used to construct, project, or carry an image in a display device, typically travels along multiple optical paths converging to a single point and/or representing a single pixel of the image being displayed. The multiple optical paths may have different and/or varying optical path lengths (OPL), which creates local intensity variations due to the phenomenon of optical interference. The optical interference occurs between image light portions propagated along the optical paths of different path lengths. The optical interference and associated fringing effects/local intensity variations hinder the application of laser-based light sources in compact display systems, because non-laser sources such as LEDs, SLEDs, etc. are substantially free of optical interference effects in the displayed image.

In accordance with an aspect of the present disclosure, a laser source for a display device may be operated in a short-pulse mode, e.g. at 5 ns or less pulsewidth, or even 1 ns or less pulsewidth. Short-pulse mode of operation tends to broaden the emission spectrum of a laser source. The spectral broadening may occur, for example, due to so-called chirping effect observed when a laser source is driven by short powering pulses. The chirping reduces coherence length of the emitted image light, thereby facilitating suppression of interference-caused image artifacts. The interference artifacts suppression enables one to use laser sources in display systems and thereby considerably improve the wall plug efficiency and reduce overheating, especially in miniature near-eye display units.

In accordance with an aspect of the present disclosure, a laser source for a display device, e.g. a laser diode source, may include a plurality of longitudinal emission modes, while optionally operating substantially in a single transversal mode. Such a light source, while retaining a good spatial definition and directivity due to the single transversal lasing mode, may produce less interference-caused image artifacts, because different longitudinal modes carry light at different wavelengths, and the interference patterns caused by different spectral lines of the image light tends to add together, evening out the overall image.

In accordance with an aspect of the present disclosure, a laser diode source for a display device may include a multi-emitter laser chip. Each emitter of the multi-emitter laser diode chip may be configured to emit image light at different emission wavelengths of a same color channel. This facilitates the reduction of interference-caused image artifacts due to different emitters producing light at different emission wavelengths.

In accordance with an aspect of the present disclosure, a laser diode source for a display device may include a plurality of laser diode chips, e.g. a plurality of single- or multi-emitter laser diode chips, each chip operating at different wavelength(s) of a same color channel. This facilitates the reduction or washing-out of interference-caused image artifacts due to different chips producing light at different emission wavelengths.

In accordance with an aspect of the present disclosure, a display device may include a laser diode source and a waveguide, e.g. a pupil-replicating waveguide. The waveguide may be antireflection (AR) coated to reduce undesired reflections from its surface. The unwanted reflections may contribute to creation of the multiple light paths causing interference artifacts.

In accordance with an aspect of the present disclosure, a display device may include a laser diode source for providing image light, and a scanner for angular scanning of the image light, such that a beam angle of the image light corresponds to a pixel of an image to be displayed as the angular scanning proceeds. A waveguide, e.g. a pupil-replicating waveguide, may convey the image light scanned by the scanner to an eyebox of the display device. The waveguide provides a plurality of light paths having different optical path lengths. The display device may include a controller operably coupled to the scanner and the laser source. The controller may be configured to operate the scanner to angularly scan the image light, obtain a beam angle of the image light, and adjust a wavelength of the image light depending on the instantaneous beam angle corresponding to a pixel of the image to be displayed so that the image light portions propagated via the plurality of light paths are constructively interfering for all pixels, i.e. beam angles.

In accordance with an aspect of the present disclosure, a display device may include a laser diode source and a waveguide, e.g. a pupil-replicating waveguide. The waveguide may have a spatial thickness variation to mitigate optical interference at the eyebox between portions of the image light propagated via different light paths of the plurality of light paths.

In accordance with the present disclosure, there is provided a display device for displaying an image to a viewer. The display device includes a pulsed laser source for providing image light carrying the image in angular domain, and a waveguide for conveying the image light to an eyebox of the display device. The waveguide is configured to provide a plurality of light paths for the image light to the eyebox, different light paths of the plurality of light paths corresponding to a same pixel of the image and having different optical path lengths. The image light may have spectral broadening due to pulsing of the image light, the spectral broadening lessening optical interference at the eyebox between portions of the image light propagated via different light paths of the plurality of light paths.

In some embodiments, the pulsed laser source has a coherence length associated with the spectral broadening due to pulsing of the image light. The coherence length may be substantially equal to or less than a difference between optical path lengths of the plurality of light paths. The pulsed laser source may have an optical frequency chirp due to pulsing of the image light, such that optical frequency chirp causes the spectral broadening. The pulsed laser source may include a plurality of longitudinal lasing modes and substantially one transversal lasing mode.

A pulsed laser driver may provide electrical driving pulses to the pulsed laser source. The pulsed laser driver may be configured to provide short enough pulses for the pulsed laser source to provide the image light in form of pulses shorter than 5 ns in duration, or even shorter than 1 ns in some cases.

In some embodiments, the display device further comprises a beam scanner optically coupled to the pulsed laser source. The pulsed laser source may be configured to provide a collimated pulsed light beam of a variable pulse energy, and the beam scanner may be configured to angularly scan the collimated pulsed light beam, thereby providing the image in angular domain. A controller may be operably coupled to the pulsed laser source and the beam scanner, for causing the beam scanner to scan the collimated pulsed light beam over a plurality of directions, each direction of the plurality of directions corresponding to a pixel of the image in angular domain, and to vary the pulse energy of the collimated pulsed light beam in coordination with the scanning, such that the pulse energy corresponds to a brightness of the corresponding pixel currently pointed at by the beam scanner. A pulse duration of the collimated pulsed light beam is sufficiently short, e.g. it may be at least four times less than a time interval during which the beam scanner points at a corresponding pixel of the image. In some embodiments, the waveguide comprises a pupil-replicating waveguide, and the beam scanner comprises a MEMS scanner.

In accordance with the present disclosure, there is provided a method for displaying an image to a viewer, the method including: using a pulsed laser source to provide image light carrying the image in angular domain, and using a waveguide to convey the image light to an eyebox of a display device, the waveguide having a plurality of light paths for the image light to propagate in the waveguide to the eyebox, different light paths of the plurality of light paths having different optical path lengths. The image light has spectral broadening due to pulsing of the image light, the spectral broadening lessening optical interference at the eyebox between portions of the image light propagated via different light paths of the plurality of light paths.

In some embodiments, the pulsed laser source has a coherence length associated with the spectral broadening due to pulsing of the image light, the coherence length being less than a difference between optical path lengths of the plurality of light paths. Providing the image light may include chirping an optical frequency of the pulsed laser source when pulsing the image light, the chirping causing the spectral broadening of the image light. Providing the image light may include operating the pulsed laser source at a plurality of longitudinal lasing modes and at substantially one transversal lasing mode.

In embodiments where the pulsed laser source is configured to provide a collimated pulsed light beam of a variable pulse energy, the method may further include: causing a beam scanner to scan the collimated pulsed light beam over a plurality of directions, each direction of the plurality of directions corresponding to a pixel of the image in angular domain; and varying the pulse energy of the collimated pulsed light beam in coordination with the scanning, such that the pulse energy corresponds to a brightness of the corresponding pixel currently pointed at by the beam scanner. A pulse duration of the collimated pulsed light beam may be at least four times less than a time interval during which the beam scanner points at a corresponding pixel of the image.

In accordance with the present disclosure, there is further provided a display device for displaying an image to a viewer, the display device comprising: a laser source for providing image light carrying the image in angular domain, the laser source having a spectral width and a coherence length associated therewith; and a waveguide for conveying the image light provided by the laser source to an eyebox of the display device. The waveguide may be configured to provide a plurality of light paths for the image light to the eyebox, different light paths of the plurality of light paths corresponding to a same pixel of the image and having different optical path lengths. The coherence length may be less than a difference between optical path lengths of the plurality of light paths, whereby optical interference at the eyebox between portions of the image light propagated via different light paths of the plurality of light paths is lessened.

In some embodiments, the laser source comprises a plurality of longitudinal lasing modes occupying a spectral band having the spectral width of the laser source. The laser source may include a multi-emitter laser chip, and each emitter of the multi-emitter laser chip may be configured to emit image light at an emission wavelength of a first color channel. The emission wavelengths of different emitters of the multi-emitter laser chip may occupy a spectral band having the spectral width of the laser source. In embodiments where the laser source comprises first and second multi-emitter laser chips, each emitter of the first and second multi-emitter laser chips may be configured to emit image light at an emission wavelength of a first color channel, and the emission wavelength of emitters of the first multi-emitter laser chip may be separated by the emission wavelength of emitters of the second multi-emitter laser chip by at least a half of the spectral width of the first or second multi-emitter laser chips, for lessening optical interference at the eyebox between portions of the image light propagated via different light paths of the plurality of light paths.

Referring now to FIG. 1, a display device 100 includes a laser source 102 configured to provide a light beam 103. In some embodiments, the light beam 103 is a collimated light beam of a time-varying intensity and/or color, e.g. a continuous-wave (cw) laser radiation of varying optical power and/or color, or laser pulses of varying pulse energy and/or spectral composition. For pulsed operation, a laser driver 104 may be configured to provide electrical driving pulses 105 to the laser source 102 to generate the light beam 103 in form of short laser pulses. In embodiments where the light beam 103 is a collimated light beam of varying intensity and/or color and/or pulse energy, a beam scanner 106 may be configured to receive and angularly scan the light beam 103 to generate image light 107 having an angular distribution of optical power density corresponding to an image to be displayed. A waveguide 108, e.g. an pupil-replicating waveguide, may be configured to convey the image light 107 generated by the laser source 102 and scanned by the optional beam scanner 106 to an eyebox 110 of the display device 100, while preserving the angular distribution of the image light 107, for the image to be directly observed by a user. Herein, the term "eyebox" means a geometrical area where an image provided by a display device may be observed by a user's eye placed at the eyebox 110.

A controller 112 may be provided for operating the laser driver 104, the laser source 102, and the beam scanner 106 in a coordinated manner to generate the desired images or video sequence. For example, for a beam scanner based on a tiltable mirror, the controller 112 may cause the beam scanner 106 to tilt its mirror to an angle corresponding to a pixel of the image to be displayed, and send a command to the laser driver 104 to produce the energizing pulse 105, causing the laser source 102 to emit a light pulse having a pulse energy corresponding to a brightness of the pixel of the image currently pointed at by the beam scanner 106. For example, if a bright pixel is to be displayed, a high-energy pulse is emitted, and if a dark pixel is to be displayed, a low-energy pulse is emitted. The controller 112 proceeds to operate the laser driver 104 and/or the laser source 102 to emit pulses of different energies and/or color composition, while scanning the light beam 103 by the bean scanner 106, until an entire image or video frame is rendered.

The waveguide 108 may be configured to support, for each pixel of the image being displayed, a plurality of light paths 109 for the image light 107 between the beam scanner 106 and the eyebox 110. Each pixel of the image may be associated with a plurality of light paths specific for that pixel. The plurality of light paths may be provided, for example, for the purpose of expanding the output pupil over the entire eyebox 110. Different light paths of the plurality of light paths 109 may have different optical path lengths, causing the image light 107 portions propagated along different light paths 109 to undergo optical interference with one another at the eyebox 110. When the coherence length of the laser source 102 is substantially longer than a difference between the optical path lengths of the plurality of light paths 109, an optical interference may change the brightness of individual pixels, cause undesired image artifacts to appear.

In some embodiments of this disclosure, the energizing electrical pulses and resulting optical pulses may have a duration short enough to broaden the emission spectrum of the light beam 103 and accordingly shorten the coherence length of the light beam 103 due to the pulsing-induced spectral broadening. As a result of the spectral broadening, optical interference and corresponding artifacts at the eyebox 110 between portions of the image light 107 propagated via different light paths of the plurality of light paths 109 may be reduced, lessened, washed out, etc.

In some embodiments of this disclosure, the laser source 102 operates at a plurality of longitudinal lasing modes, but substantially only at one transversal lasing mode. The light beam 103 may include a plurality of spectral lines corresponding to the plurality of longitudinal lasing modes of the laser source 102, while preserving the beam quality afforded by the single transversal lasing mode. As will be explained in more detail below, the plurality of lasing modes may have an envelope spectrum wide enough to shorten the associated coherence length of the laser source 102, thereby lessening the optical interference at the eyebox 110 between portions of the image light 107 propagated via different light paths of the plurality of light paths 109.

The surfaces of the waveguide 108 may be antireflection (AR) coated to further reduce unwanted reflections propa-gating along multiple optical paths. Furthermore in some embodiments, the waveguide 108 may have a spatial thickness variation to further lessen optical interference at the eyebox between portions of the image light 107 propagated via different light paths of the plurality of light paths 109.

Figure 2:
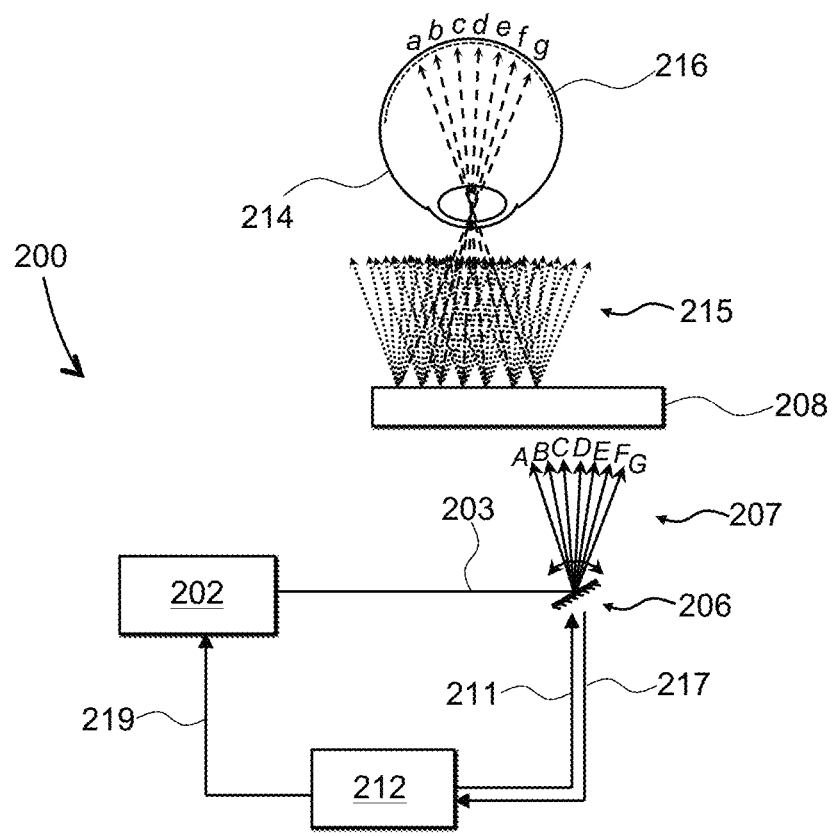
FIG. 2 is a schematic view of a near-eye scanning display embodiment of the display device of FIG. 1.

Turning to FIG. 2, a near-eye scanning display device 200 is an embodiment of the display device 100 of FIG. 1. The near-eye scanning display device 200 includes a solid-state single-mode or multimode laser light source 202, e.g. a edge-emitting laser diode, a edge-emitting laser diode array, a vertical-cavity surface-emitting laser diode (VCSEL), a VCSEL array, etc. In operation, the light source 202 generates a collimated light beam 203. A beam scanner 206, e.g. a microelectromechanical system (MEMS) with a tiltable reflector, is optically coupled to the light source 202 for scanning the collimated light beam 203 in one or two dimensions, e.g. about an X-axis and/or Y-axis perpendicular to the X-axis, to produce a beam fan 207. The X- and Y-axes may be disposed in plane of the MEMS reflector at its normal i.e. unpowered position. Pre-tilted MEMS reflectors may also be used. A waveguide 208 provides a light field 215 including multiple laterally displaced parallel copies of the scanned collimated light beam 203, i.e. multiple laterally offset copies of the beam fan 207.

A controller 212 is operably coupled to the light source 202 and the beam scanner 206. The controller 212 may be configured for providing driving signals 211 to the beam scanner 206, and control signals 219 to the light source 202 in coordination with operating the beam scanner 206. For example, the controller 212 may cause the beam scanner 206 to scan the collimated light beam 203 through a succession of directions "A" through "G" in coordination with causing the light source 202 to change the light pulse energy (for pulsed operation), optical power level (for cw operation), and/or color composition of the collimated light beam 203 (for colored image in any of the pulsed or cw operation), to form a rendered monochrome or color image in angular domain. In other words, the directions "A" through "G" are directions of the collimated light beam 203 as it is scanned, with a corresponding variation in pulse energy/power level/color composition, as the case may be. A feedback circuit may be provided to provide information about the current MEMS reflector angular position by means of feedback signals 217 to the controller 212. The feedback signals 217 may include, for example, temporal sampling of the X and Y MEMS angular position, sync signals at specific predetermined MEMS reflector tilt angles, etc.

The waveguide 208 is a pupil-replicating waveguide, also termed beam-replicating waveguide, providing multiple laterally displaced parallel copies of the collimated light beam 203 as the collimated light beam 203 is scanned by the beam scanner 206 through directions "A", "B", "C", "D", "E", "F", and "G". A viewer's eye 214 receives the light field 215, and forms an image at the eye's retina 216 from the corresponding replicated light beams at various beam angles. A linear position of the beam copies on the eye's retina 216 is denoted with letters "a" through "g" corresponding to the directions "A" through "G" of the scanned collimated light beam 203. In this manner, the eye 214 forms a linear image on the eye's 214 retina 216 from the image in the angular domain formed by the light field 215. The scanning is preferably performed faster than the integration time of the eye 214, such that the eye 214 perceives a continuous, non-flickering image.

Figure 3:
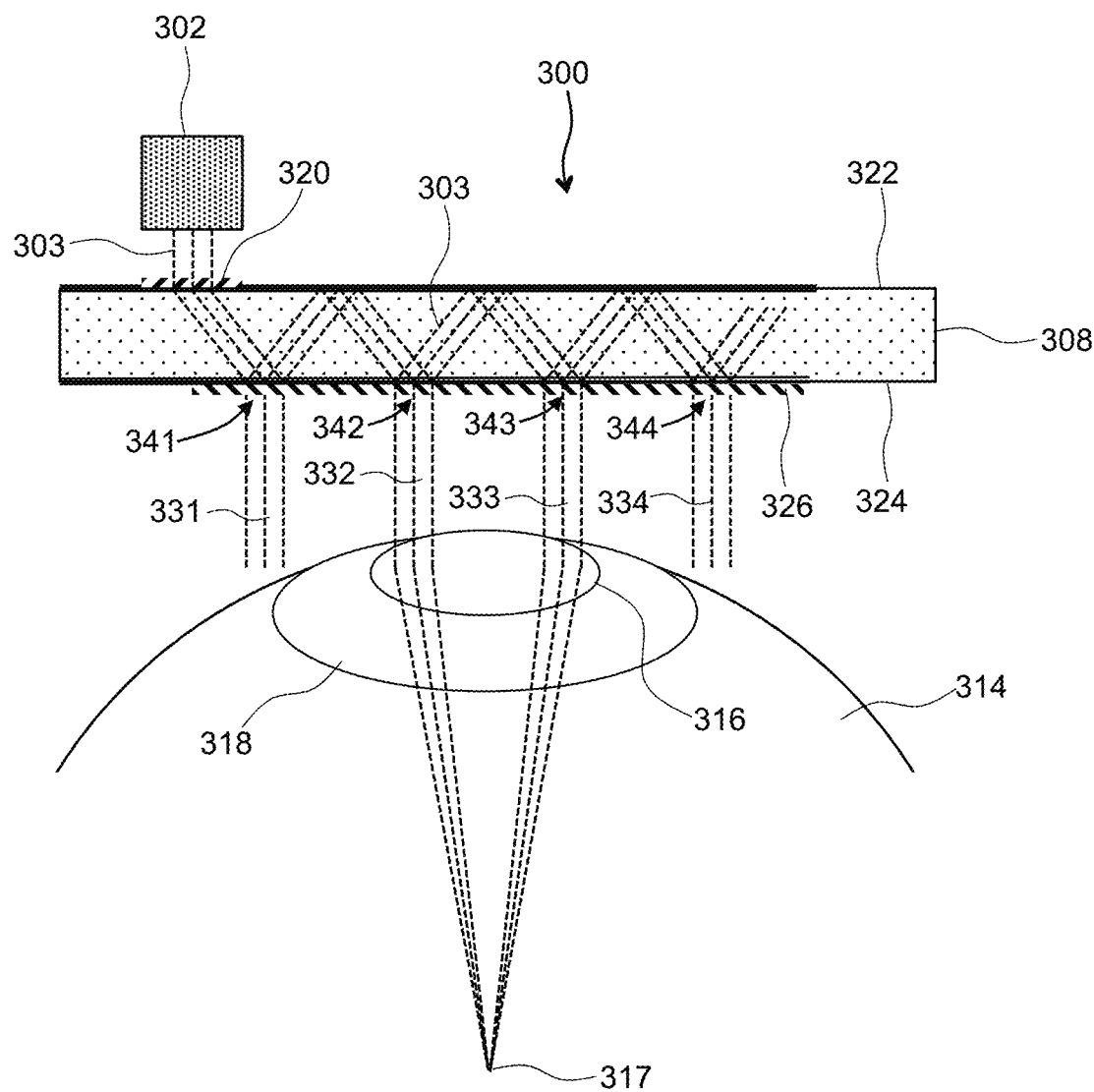
FIG. 3 is a schematic side cross-sectional view of a near-eye display with a pupil-replicating waveguide showing multiple optical paths of image light reaching an eye pupil.

Turning to FIG. 3, multiple optical paths in a near-eye display 300 including a pupil-replicating waveguide 308 are illustrated. The pupil-replicating waveguide 308 is optically coupled to a light engine 302, which provides image light carrying an image in angular domain to be displayed to an eye 314. The light engine 302 may include, for example, a laser source coupled to a beam scanner, as in the near-eye scanning display device 200 of FIG. 2, or a small projector based on a one- or two-dimensional array of laser diodes. Only one beam 303 of image light, corresponding to one field angle or one pixel of the image in angular domain, is shown in FIG. 3 for clarity. It is to be understood that the image light may include beams at multiple angles, simultaneously or sequentially, within a field of view observable by the eye 314.

An in-coupler 320, e.g. a diffraction grating, may be provided to in-couple the beam 303 for propagation in the waveguide 308. The waveguide 308 has opposed top 322 and bottom 324 surfaces for guiding the beam 303 between the surfaces 322,324 by reflection, e.g. total internal reflection (TIR), from the surfaces 322,324. An out-coupling element 326, such as a surface-relief diffraction grating, a volume Bragg grating (VBG), a hologram, etc., can be disposed in an optical path of the beam 303 for out-coupling portions 331,332,333,334 of the beam 303 at a plurality of spaced apart locations 341,342,343,344 along the optical path. It is seen that some portions 332,333 of the beam 303 are in-coupled together into the eye's pupil 316, and are brought together to a common focal point 317 at the eye's retina by the eye's cornea/lens 318. It is at the common focal point 317, or other such focal points, where the optical interference may take place. It is at the common focal point 317 where the interference takes place.

Figure 4A:
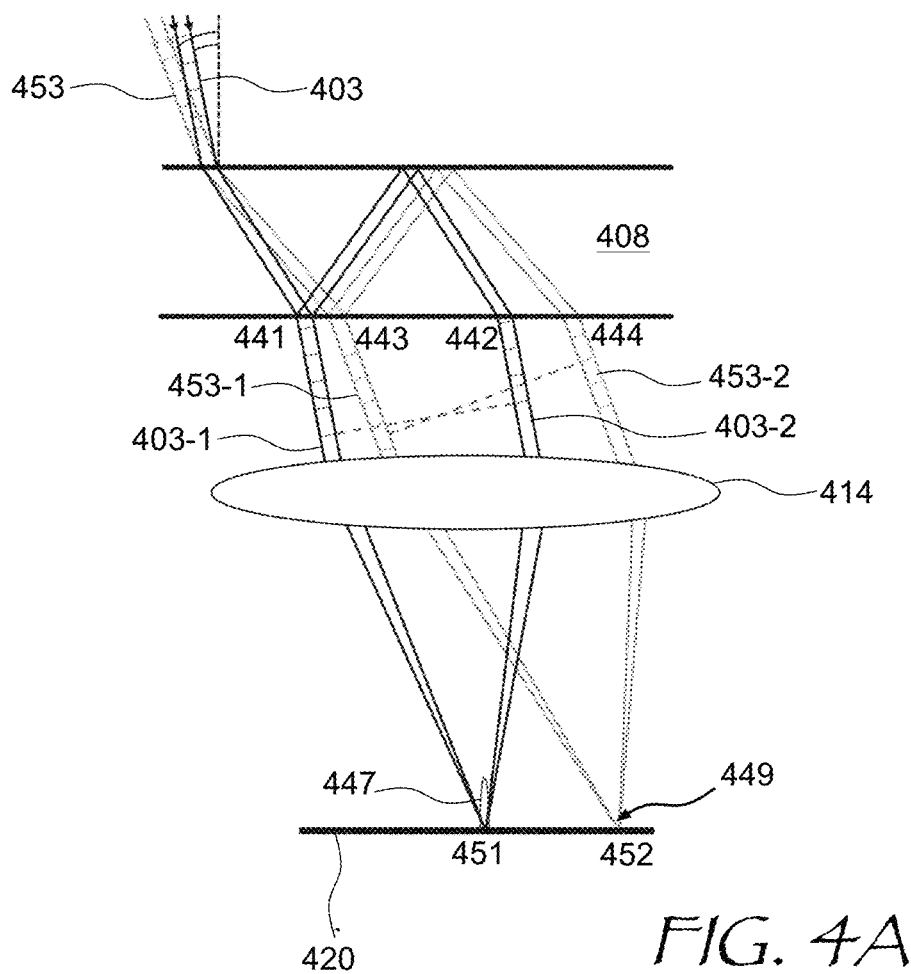
FIG. 4A is a schematic side cross-sectional view of an interference test apparatus for a near-eye display mimicking the near-eye display of FIG. 3.

FIG. 4A shows an optical diagram of a setup for measuring optical interference caused by beam replication. A first light beam 403 is injected into a pupil-replicating waveguide 408 at a first angle of incidence. The pupil-replicating waveguide 408 out-couples portions 403-1 and 403-2 the first light beam 403 at first 441 and second 442 locations, respectively. The beam portions 403-1 and 403-2 are focused by a lens 414, which mimics the cornea/lens 318 of the eye 314 of FIG. 3, to a single first point 451 on a photodetector array 420. In this example, an optical path difference between the beam portions 403-1 and 403-2 is equal to an integer number of wavelengths of the first light beam 403, creating an amplitude peak 447 at the first point 451.

Figure 4B:
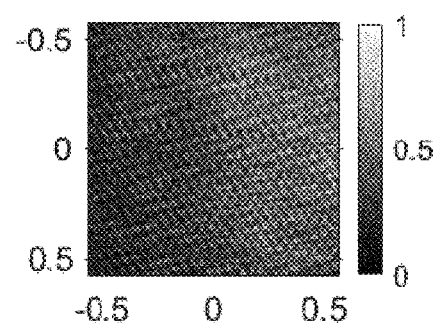
FIG. 4B is an intensity plot showing pupil interference patterns at a photodetector array of the interference test apparatus of FIG. 4A.

A second light beam 453 is injected into the pupil-replicating waveguide 408 at a second angle of incidence different from the first angle of incidence. The pupil-replicating waveguide 408 out-couples portions 453-1 and 453-2 the second light beam 453 at third 443 and fourth 444 locations, respectively. The beam portions 453-1 and 453-2 are focused by the lens 414 to a single second point 452 on the photodetector array 420. In this example, an optical path difference between the beam portions 403-1 and 403-2 is equal to an odd number of half-wavelengths of the first light beam 403, creating a local minimum 449 at the second point 452. The resulting optical interference pattern is illustrated in FIG. 4B, showing optical power density vs. coordinates in field-of-view angle units. It consists of tightly spaced quasi-periodic patterns of bright and dark bars or dots, the bright spots corresponding to constructive interference, and the dark spots corresponding to destructive interference accordingly.

Figure 5A:
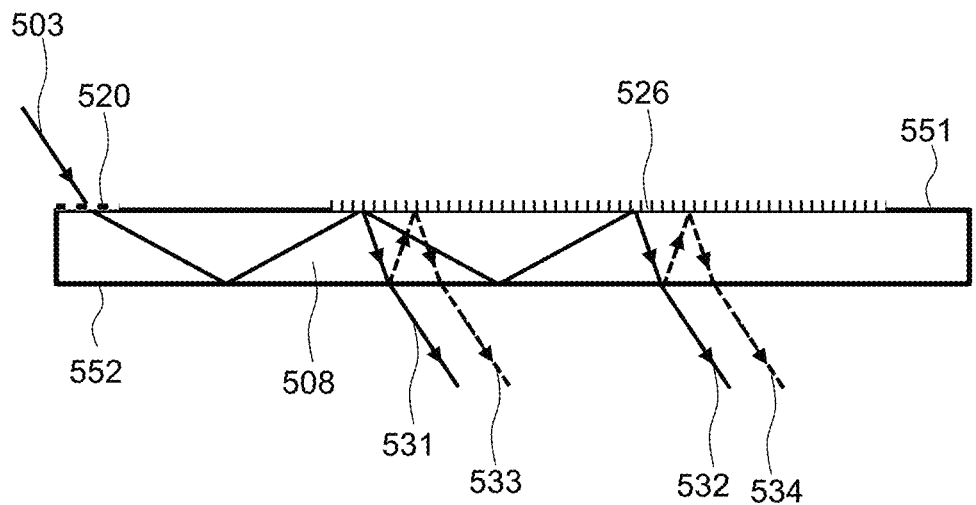
FIG. 5A is a side cross-sectional view of the pupil-replicating waveguide of FIG. 2 or FIG. 3, showing multiple optical paths due to Fresnel reflection from a surface of the pupil-replicating waveguide.
Figure 5B:
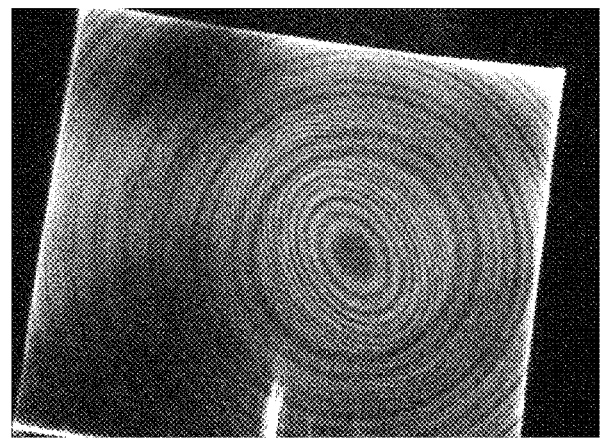
FIG. 5B is an intensity plot showing Newton ring artifacts formation due to light interference of the image light in the pupil-replicating waveguide of FIG. 5A.

The formation of another type of interference pattern—Newton rings—is illustrated in FIGS. 5A and 5B. Referring to FIG. 5A, a pupil-replicating waveguide 508 has top 551 and bottom 552 surfaces and in-coupling 520 and out-coupling 526 gratings at the top surface 551. A light beam 503 is coupled into the pupil-replicating waveguide 508 by the in-coupling grating 520. Once in-coupled, the light beam 503 propagates in the pupil-replicating waveguide 508 in the zigzag pattern, diffracting each time the light beam 503 impinges upon the out-coupling grating 526. When a first diffracted beam portion 531 impinges onto the bottom surface 552 of the pupil-replicating waveguide 508, a portion 533 of that light is reflected by the bottom surface 552 and propagates upwards, is reflected by the top surface 551, and propagates down and parallel to the first diffracted beam portion 531. When the second diffracted beam portion 532 impinges onto the bottom surface 552, a portion 534 of that light is reflected by the bottom surface 552 and propagates upwards, is reflected by the top surface 551, and propagates down and parallel to the second diffracted beam portion 532, and so on. The resulting concentric ring interference pattern is shown in FIG. 5B. It is noted that Newton ring interference artifacts may be reduced by AR coating the surfaces 551,552 of the pupil-replicating waveguide 508.

Figure 6A:
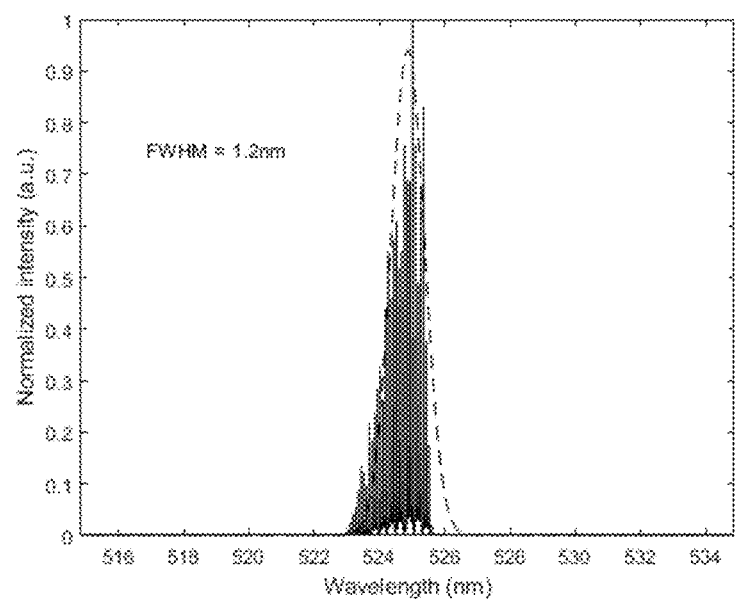
FIG. 6A is a spectral plot of a laser diode source having a group of spectral lines corresponding to longitudinal lasing modes of the laser diode light source when driven at a constant power level.
Figure 6B:
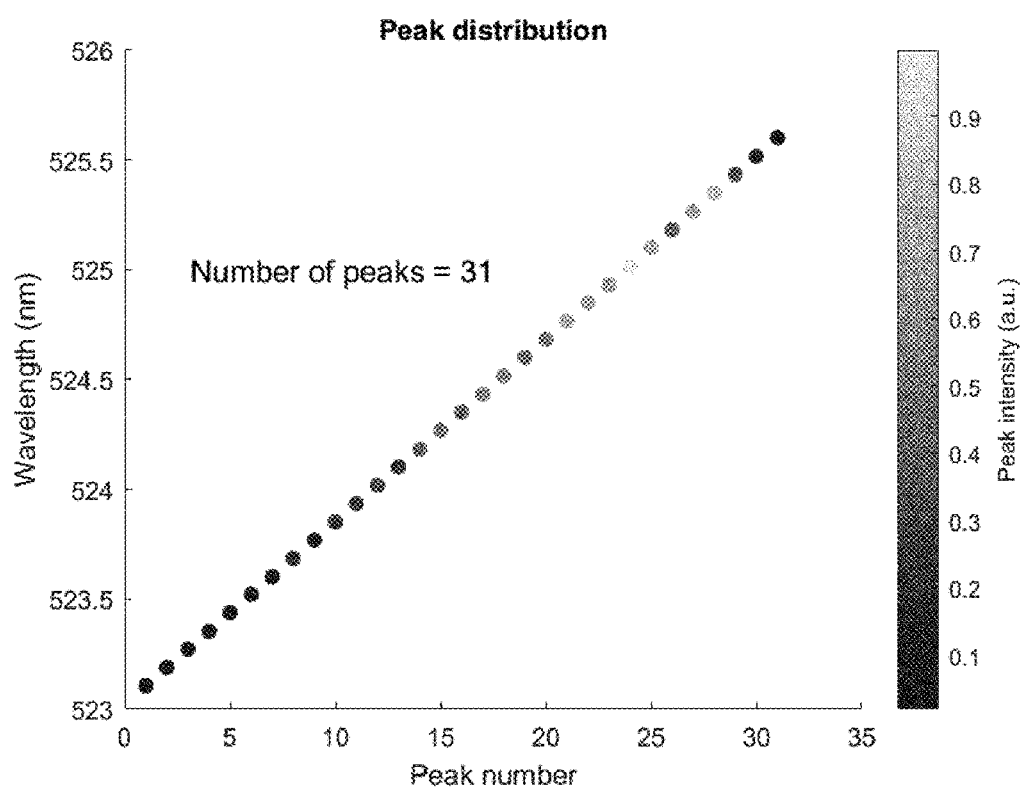
FIG. 6B is a wavelength and power distribution of the spectral lines of FIG. 6A.

Non-limiting examples of laser light sources for a display of this disclosure will now be considered. Referring to FIG. 6A, a normalized spectral emission plot of a substantially single transverse mode, multiple longitudinal modes green laser source represents a case when the laser source is driven in cw mode. The total of thirty one equidistantly spaced spectral peaks have a wavelength linearly varying from 523 nm to 526 nm, with a best-fit Gaussian envelope full width at half maximum (FWHM) being about 1.2 nm in this example. The peak wavelength vs. peak number is plotted in FIG. 6B, with the grayscale representing an amplitude or strength of a corresponding spectral peak. Herein, the term "substantially single transversal mode" refers to a case when the lowest-order transversal mode, e.g. $TEM_{00}$ mode, is a dominant lasing mode, and a percentage of generated laser power in higher-order modes is insignificant, e.g. less than 10% of the total generated optical power. The substantially single transversal mode operation is beneficial because it enables higher beam quality and better coupling to the optical system, and accordingly it affords a higher spatial resolution of a display system based on such a laser source. In practical terms, it may be preferable that the $M^2$ parameter of the laser beam, which defines the laser beam quality, is less than 1.5, or even less than 1.2 in some embodiments.

Figure 7A:
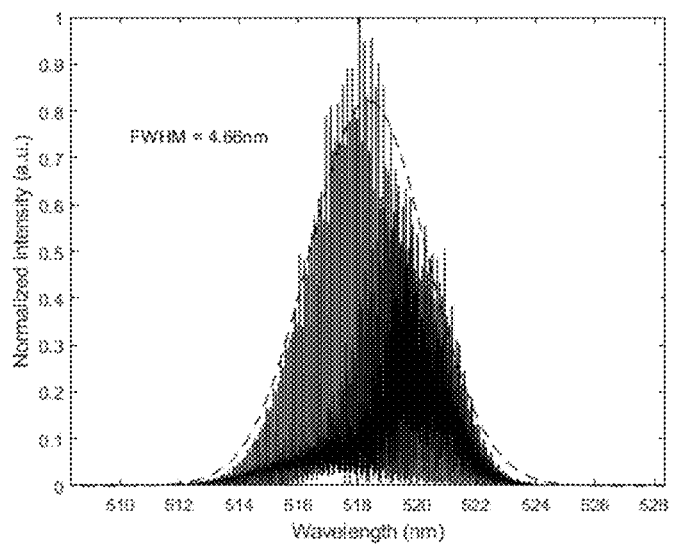
FIG. 7A is a spectral plot of a laser diode source having a group of spectral lines corresponding to longitudinal lasing modes of the laser diode light source in pulsed regime of operation.

Turning now to FIG. 7A, a spectral emission plot of the same green laser source illustrates a case where the green laser source is driven by electric pulses short enough to provide light pulses less than 5 ns in duration. The total of about 120 spectral peaks at peak wavelength ranging from 513 nm to 523 nm, the FWHM of the Gaussian envelope being about 4.66 nm. The peak wavelength/power vs. peak number is plotted in FIG. 7B. The spectral broadening introduced by pulsed mode of operation results in shortening of the coherence length of light emitted by the laser source, which can wash out or weaken the pupil interference patterns of FIG. 4B and/or the Newton ring interference patterns of FIG. 5B. When the coherence length is substantially equal to or less than a difference between optical path lengths of the plurality of light paths, the interference may be effectively suppressed. For certainty, herein and throughout the rest of this specification, the term "substantially" is taken to mean a deviation of +/−10% from a nominal value.

The broadening effect of the pulsed operation of the laser source may be due to so-called chirping effect, where optical frequency of generated laser radiation varies in time, or chirps, during the pulse generation. The light pulses may be less than 5 ns in duration, and even less than 1 ns in some embodiments, to provide a stronger spectral broadening.

Figure 8A:
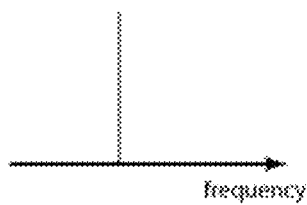
FIG. 8A is an illustrative spectral diagram of a single-longitudinal mode laser diode source.

Referring to FIG. 8A, a spectrum of a single transversal mode, single longitudinal mode laser source is presented. Such a laser source emits monochromatic light with a long coherence length, and accordingly the interference-caused image artifacts are at maximum.

Figure 8B:
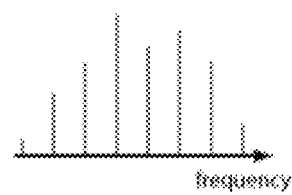
FIG. 8B is an illustrative spectral diagram of a multi-longitudinal mode laser diode source operating in a single transversal mode.

Referring to FIG. 8B, a spectrum of a single transversal mode, multiple longitudinal modes laser source is presented. Such a laser source emits quasi-monochromatic light with a shorter coherence length as compared to FIG. 8A, and accordingly the interference-caused image artifacts may be washed out when the coherence length becomes comparable to or less than an optical path length difference between different paths in a pupil-replicating waveguide.

Figure 7B:
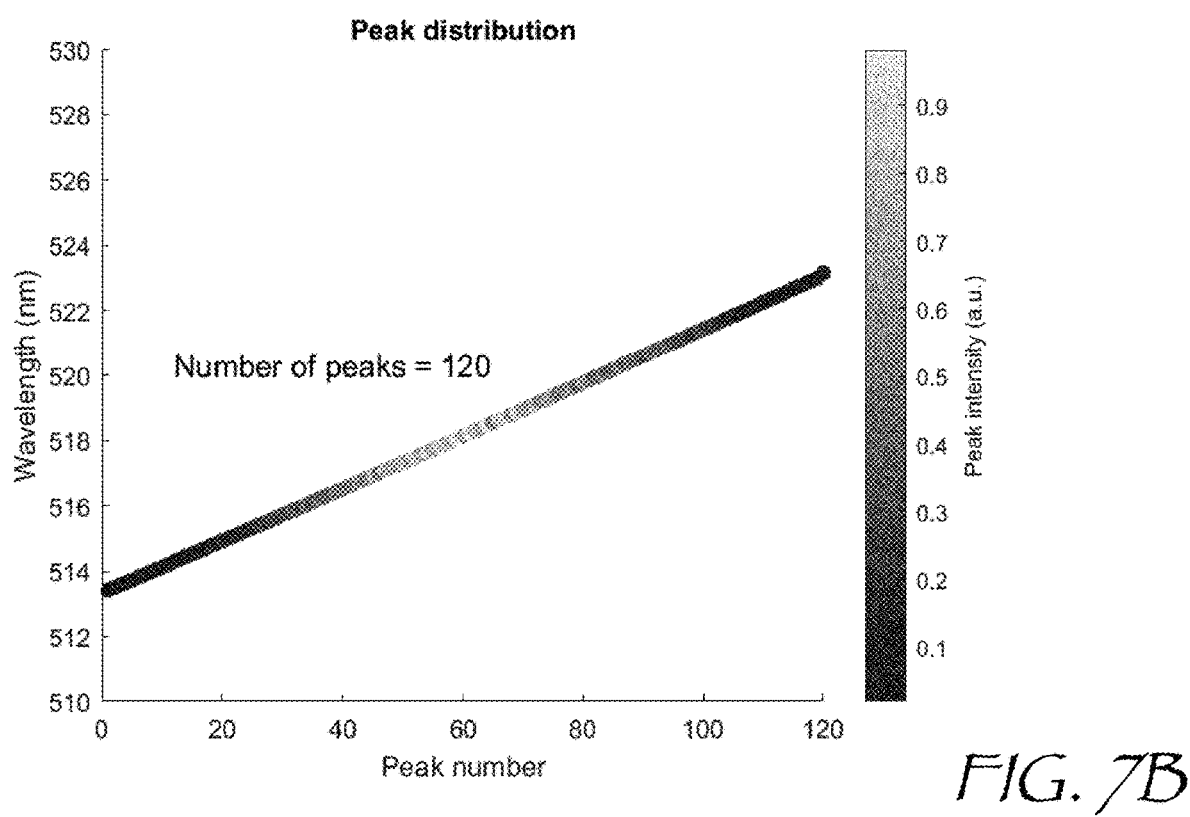
FIG. 7B is a wavelength and power distribution of the spectral lines of FIG. 7A.
Figure 9A:
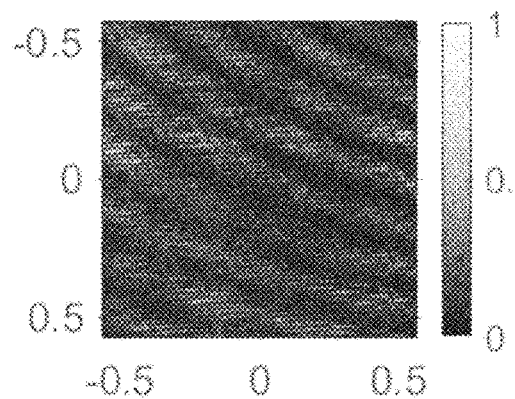
FIG. 9A is a multipath pupil interference pattern with a continuous-wave (cw) single longitudinal mode green laser.
Figure 9B:
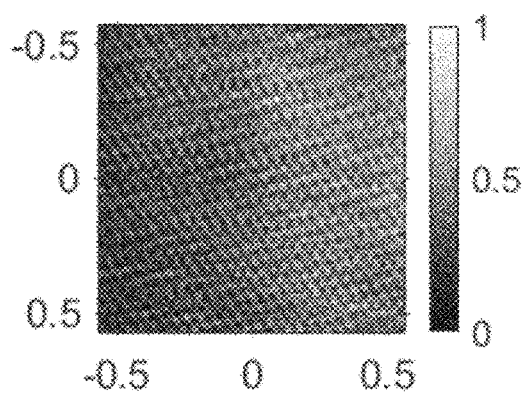
FIG. 9B is a multipath pupil interference pattern with a continuous-wave (cw) multiple longitudinal modes green laser.
Figure 9C:
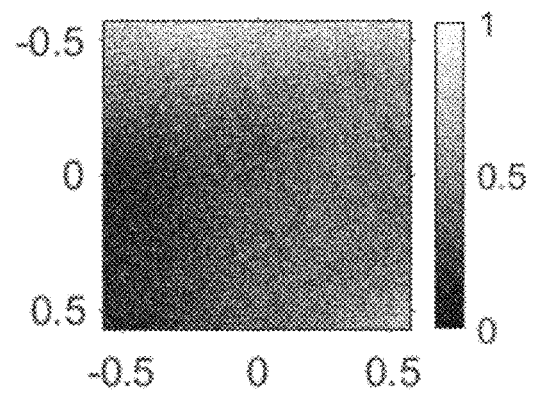
FIG. 9C is a multipath pupil interference pattern with a pulsed multiple longitudinal modes green laser.

FIGS. 9A to 9C illustrate the effect of multiple longitudinal modes operation and pulsed operation of a laser source on interference pattern formation caused by a pupil interference in a display powered by the laser source. The interference patterns of FIGS. 9A, 9B, and 9C were obtained with the optical interference measuring setup of FIG. 4A. FIG. 9A shows an interference pattern formed on the photodetector array 420 (FIG. 4A) with a green single longitudinal mode laser emitting monochromatic light having a spectral line corresponding to a single longitudinal mode (FIG. 8A). FIG. 9B shows an interference pattern formed with a green multiple longitudinal modes laser (having the spectrum shown in FIGS. 6A, 6B, and FIG. 8B) on the photodetector array 420 of the setup of FIG. 4A. Finally, FIG. 9C corresponds to a pulsed multiple longitudinal modes laser source, the spectrum of which is shown in FIGS. 7A, 7B. FIG. 9C shows almost no traces of an interference pattern. Thus, a multiple longitudinal mode operation and a pulsed operation of a laser source both contribute, in a cumulative manner, to lessening or reducing fringing caused by pupil interference.

Figure 10A:
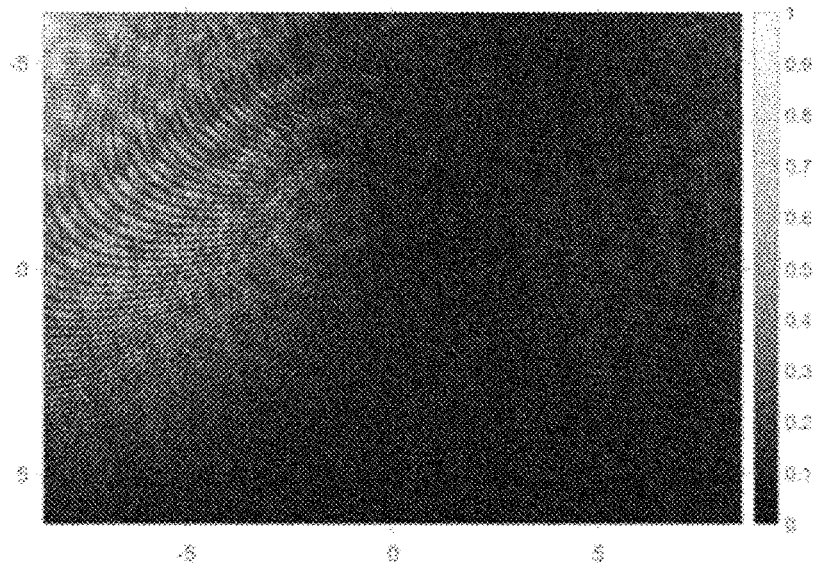
FIG. 10A is a Newton rings interference pattern with a continuous-wave (cw) single longitudinal mode green laser.
Figure 10B:
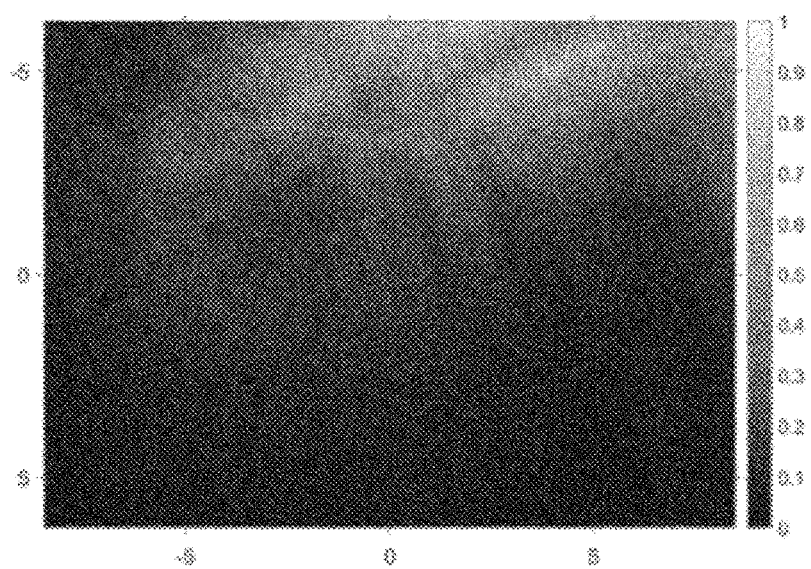
FIG. 10B is a Newton rings interference pattern with a continuous-wave (cw) multiple longitudinal modes green laser.
Figure 10C:
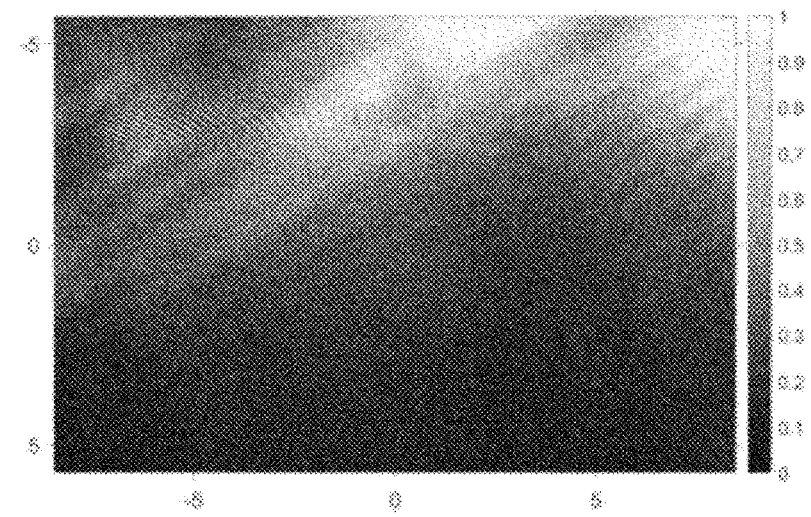
FIG. 10C is a Newton rings interference pattern with a pulsed multiple longitudinal modes green laser.

FIGS. 10A to 10C illustrate the effect of multiple longitudinal mode operation and pulsed operation of a laser source on interference pattern formation caused by Newton rings-type interference in a display powered by the laser source. The interference patterns of FIGS. 10A, 10B, and 10C were all obtained with the optical interference measuring setup of FIG. 4A. FIG. 10A shows an interference pattern formed on the photodetector array 420 with a green single longitudinal mode laser emitting monochromatic light, the spectrum of which is shown in FIG. 8A. FIG. 10B shows an interference pattern formed with a green multiple longitudinal modes laser (example spectra presented in in FIGS. 6A, 6B, and FIG. 8B) on the photodetector array 420 of the setup of FIG. 4A. Finally, FIG. 10C corresponds to a pulsed multiple longitudinal modes laser source, the spectrum of which is shown in FIGS. 7A, 7B. FIG. 10C shows almost no high-frequency rippling pattern characteristic of Newton ring interference. Thus, a multiple longitudinal mode operation and a pulsed operation of a laser source both contribute to lessening or reducing Newton ring fringing in images formed with the laser source.

Figure 11:
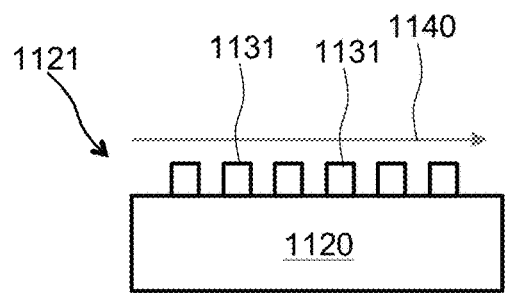
FIG. 11 is a schematic frontal view of a display light source including a multi-ridge laser source with laterally varying emission wavelengths.

Referring to FIG. 11, a multi-emitter laser chip 1121 may be used as a light source for a display of this disclosure. The multi-emitter laser chip 1121 includes a plurality of emitters 1131 on a common substrate 1120. Each emitter 1131 of the multi-emitter laser chip 1121 is configured to emit image light at an emission wavelength of a same color channel. The emission wavelengths of different emitters 1131 of the multi-emitter laser chip 1121 may be different, e.g. they may monotonically increase or decrease along a direction indicated by an arrow 1140. The emission wavelengths of different emitters 1131 may occupy a spectral band wide enough to lessen optical interference at the eyebox between portions of the image light propagated via different light paths of the plurality of light paths, e.g. pupil interference, Newton rings interference, etc.

Figure 12:
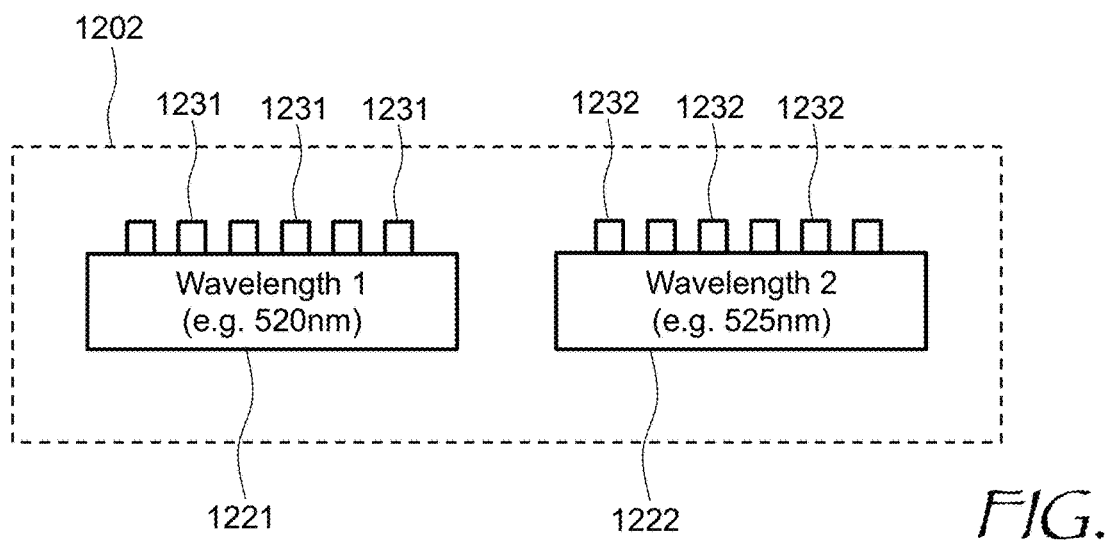
FIG. 12 is a schematic frontal view of a display light source including a pair of multi-ridge laser sources operating at different emission wavelengths.

Referring to FIG. 12, a laser source 1202 includes first 1221 and second 1222 multi-emitter laser chips including a plurality of emitters 1231 and 1232 respectively. Each emitter 1231, 1232 of the multi-emitter laser chips 1221, 1222, respectively, is configured to emit image light at an emission wavelength of a same color channel. The emission wavelength of emitters 1231 of the first multi-emitter laser chip 1221 is different from the emission wavelength of emitters 1232 of the second multi-emitter laser chip 1222. In some embodiments, the separation of the emission wavelengths of the multi-emitter laser chips 1221, 1222 is at least a half of the spectral width of multi-emitter laser chips 1221, 1222, the spectral width being defined as full width at half maximum (FWHM). This enables one to lessen optical interference at the eyebox between portions of the image light propagated via different light paths. In other embodiments, a laser source may include a plurality of multi-emitter laser chips with varying emission wavelengths, e.g. the multi-emitter laser chip 1121 of FIG. 11, or a plurality of laser chips, which may be single- or multiple-emitter chips.

Figure 13:
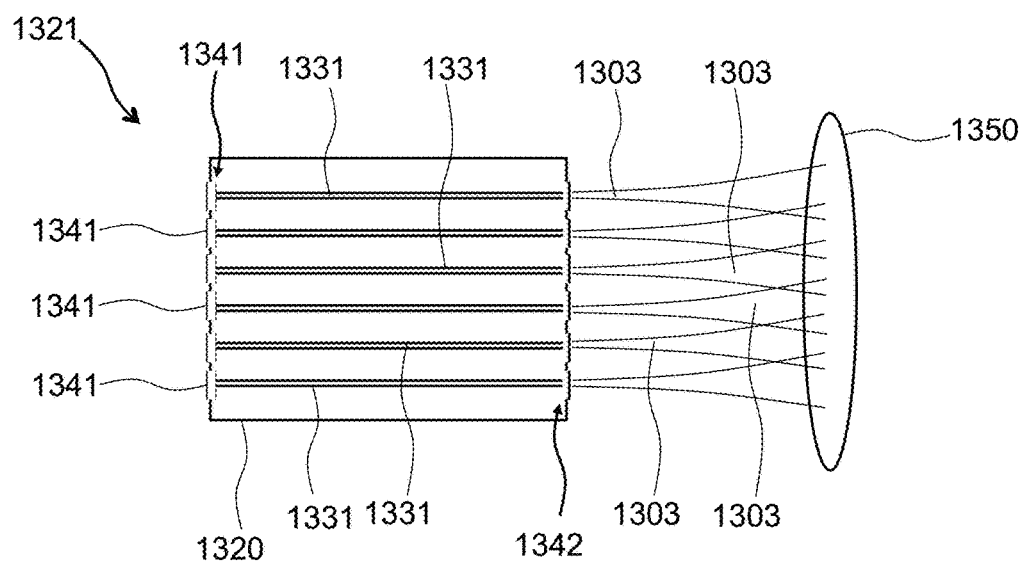
FIG. 13 is a schematic plan view of the multi-ridge laser sources of FIG. 11 or 12.

A plan view of a typical multi-emitter laser chip, e.g. the multi-emitter laser chips 1121, 1221, and 1222 of FIGS. 11 and 12, is shown in FIG. 13. A multi-emitter laser chip 1321 includes a plurality of emitters supported by a substrate 1320. Each emitter includes an active ridge waveguide 1331 bound on opposite ends by mirrors 1341,1342. Advantageously, light beams 1303 emitted at the end faces of the active ridge waveguide 1331 are all disposed in one plane perpendicular to the emitted light beams 1303, facilitating their collimation by a common collimator optical element 1350.

Figure 14A:
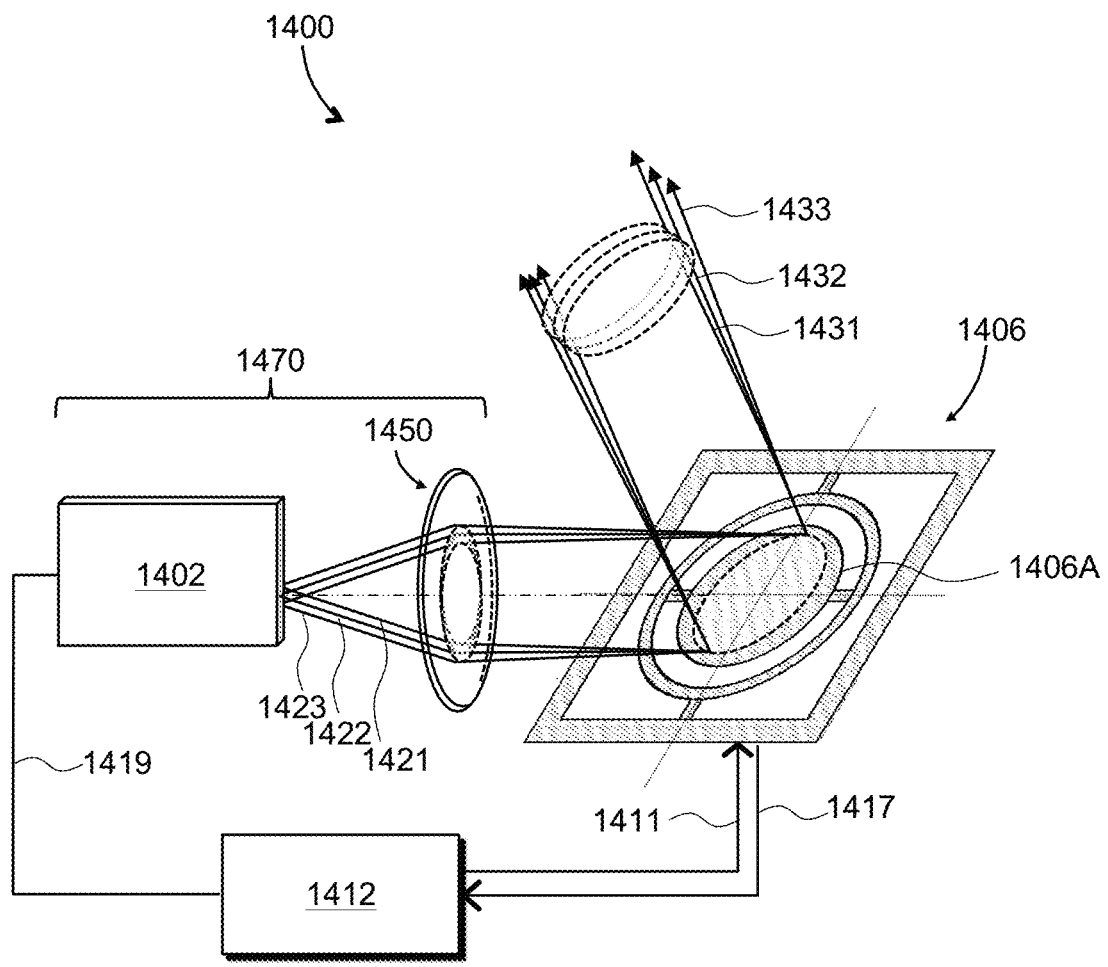
FIG. 14A is a schematic 3D view of a display projector including a multi-emitter laser source of FIG. 11 or FIG. 12 and a microelectromechanical system (MEMS) beam scanner.

A display projector using multi-emitter light sources of FIGS. 11 to 13 will now be considered. Referring to FIG. 14A, a display projector 1400 includes a multi-emitter light source 1402 providing a plurality of diverging light beams, e.g. three diverging light beams 1421, 1422, and 1423 in this example. A collimator 1450 is optically coupled to the multi-emitter light source 1402. The collimator 1450 may include a refractive lens, a folded-path optical element having focusing power, a concave reflector, a diffractive lens, etc. The collimator 1450 collimates the diverging light beams 1421, 1422, and 1423 to obtain respective collimated light beams 1431, 1432, and 1433. Together, the multi-emitter light source 1402 and the collimator 1450 form a light engine 1470. The collimated light beams 1431, 1432, and 1433 converge onto a tiltable reflector 1406A of a 2D MEMS scanner 1406. A pair of 1D MEMS scanners coupled via a pupil relay may be used in place of the 2D MEMS scanner 1406.

A controller 1412 is operably coupled to the multi-emitter light source 1402 and the 2D MEMS scanner 1406. The controller 1412 may be configured to provide control signals 1419 to the multi-emitter light source 1402 in coordination with operating the 2D MEMS scanner 1406 by providing driving signals 1411 to scan the collimated light beams 1431, 1432, and 1433 together, to provide an image in angular domain. Feedback signals 1417 may be provided by the MEMS scanner 1406 to the controller 1412 to facilitate determination of the current tilt angle(s) of the tiltable reflector 1406A by the controller 1412. When viewed by the eye 214 (FIG. 2), the image in angular domain is projected by the eye's cornea and lens to become a spatial-domain image on the eye's retina 216.

The controller 1412 may look up an image to be displayed, e.g. a current frame of a video feed, and determine which pixel or pixels correspond to the current X- and Y-tilt angles of the tiltable reflector 1406A. From that, the controller 1412 may determine the corresponding brightness and/or color value of the pixels. Several pixels are looked up because the multi-emitter light source 1402 includes a plurality of individually and simultaneously energizable emitters, each "painting" or energizing its own pixel. The controller 1412 then provides the control signals 1419 to operate the multi-emitter light source 1402 at power levels corresponding to the required brightness and color of the pixel(s) being painted.

Figure 14B:
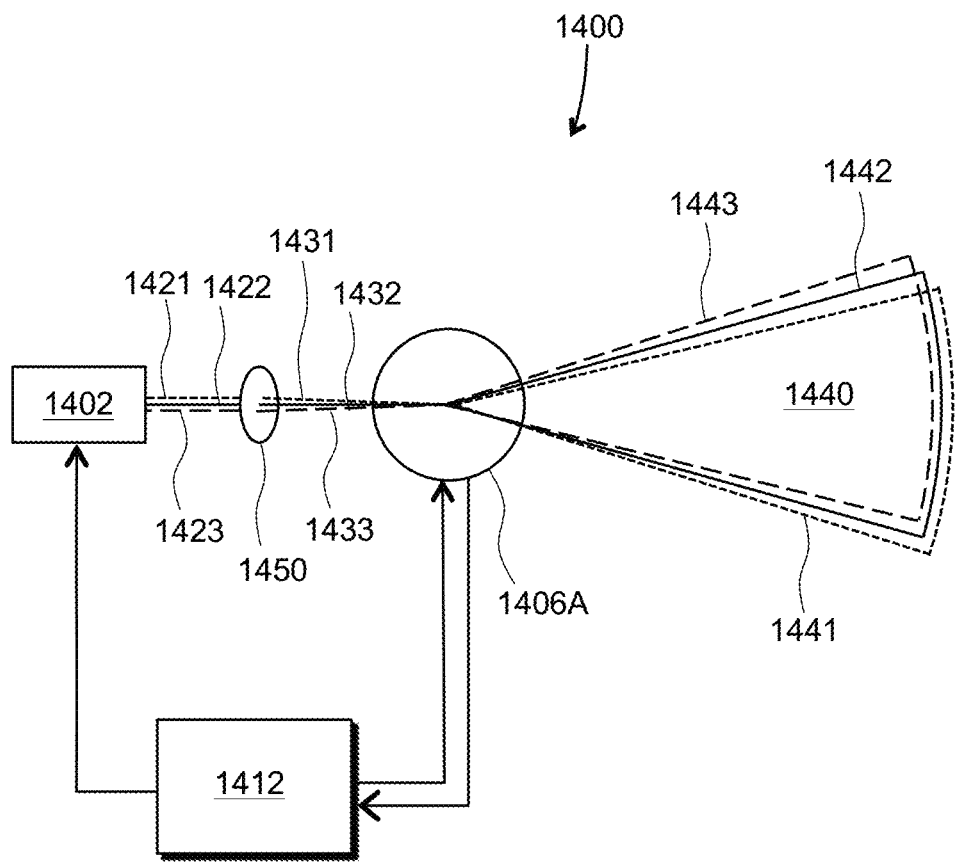
FIG. 14B is a schematic top view of the display projector of FIG. 14A illustrating a relationship between fields of view provided by individual emitters of the multi-emitter laser source.

The operation of the display projector 1400 is further illustrated in FIG. 14B. The multi-emitter light source 1402 includes three emitters each providing a parallel diverging light beam: (only chief rays shown) 1421 (dotted lines), 1422 (solid lines), and 1423 (dashed lines). At least two emitters, or three or more emitters may be provided. The collimator 1450 collimates the diverging light beams 1421, 1422, and 1423. By selecting suitable geometry e.g. distances and focal length of the collimator 1450, the latter may also cause the collimated light beams 1431, 1432, and 1433 to impinge onto a center of the reflector 1406A at slightly different angles of incidence, for scanning the fan of three collimated light beams 1431, 1432, and 1433 together. Since the angles of incidence of the collimated light beams 1421, 1422, and 1423 onto the tiltable reflector 1406A are different, respective scanning areas 1441 (dotted lines), 1442 (solid lines), and 1443 (dashed lines) of the collimated light beams 1431, 1432, and 1433, respectively, are mutually offset as shown. When individual emitters are separated from one another, the respective pixels being painted are non-adjacent, i.e. may be separated by one or more other image pixels. The controller 1412 may take these spatial offsets into account by providing corresponding delays to the driving signals of the three emitters of the multi-emitter light source 1402. Spatial offsets, in combination with the delays in energizing individual emitters, may be provided such as to effectively triple the spatial resolution of the display projector 1400 in a common scan area 1440, as compared to a case of a single emitter. Spatial offsets may also provide a higher rate for a given oscillation frequency of the tiltable reflector 1406A of pixel painting in the scan area by painting multiple pixels simultaneously. Different wavelengths of the emitters of the multi-emitter light source 1402, within a same color channel, may facilitate washing out coherent interference artifacts; this may occur even when different emitters of the multi-emitter light source paint different pixels simultaneously. Even when light emitted by different emitters does not interfere directly, it may form interference patterns that are laterally shifted relative to one another. During the display operation, the laterally shifted interference pattern may have a tendency to wash out, or average out.

Figure 15:
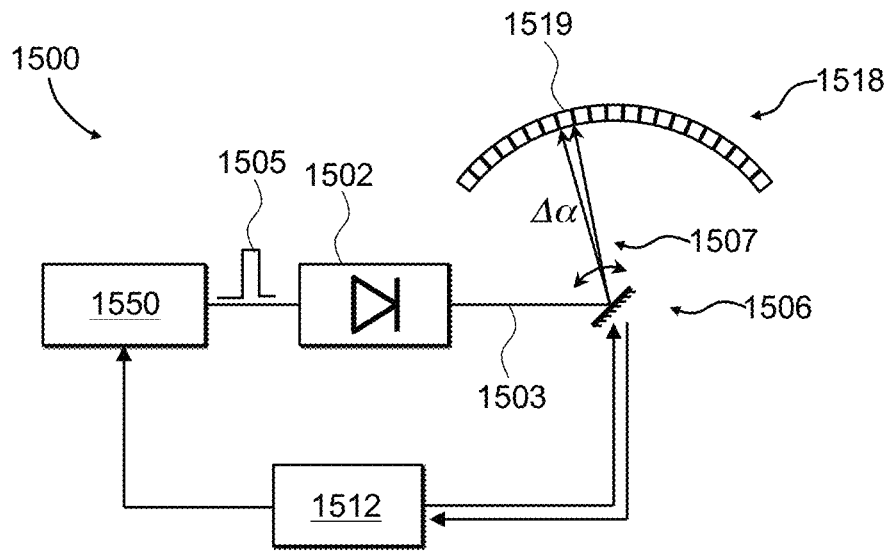
FIG. 15 is a schematic view of a projection display scanning across a pixel of an image.
Figure 16A:
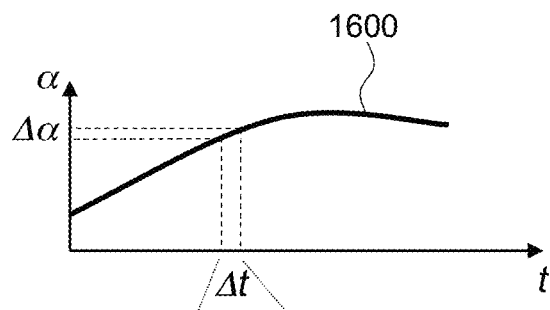
FIG. 16A is a graph of a pointing angle vs. time of a scanner of the projection display of FIG. 15.
Figure 16B:
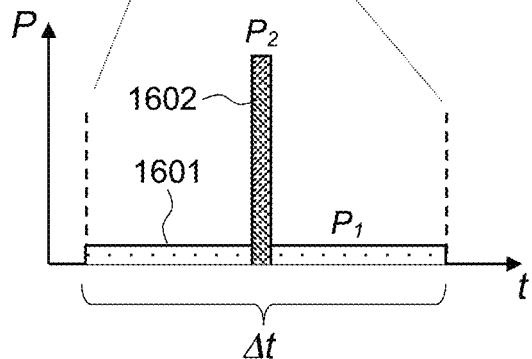
FIG. 16B is a graph of the laser output power vs. time during scanning across the pixel of FIG. 15.

Details of pulsed operation of a scanning projector-based display device of this disclosure, e.g. the near-eye scanning display device 200 of FIG. 2, are further considered in FIG. 15 and FIGS. 16A, 16B. Referring first to FIG. 15, a scanning display 1500 includes a pulsed laser light source 1502, which is a single-emitter light source in this example. The pulsed laser light source 1502 is powered by an electronic driver 1550. A beam scanner 1506 receives a collimated light beam 1503 from the pulsed laser light source 1502 and scans the collimated light beam 1503 in a plurality of directions, forming a beam fan 1507. The electronic driver 1550 provides powering pulses 1505 to the light source 1502 such that a pulsewidth of the emitted light pulse is less than a time interval during which the scanner 1506 of the scanning display 1500 is directing the collimated light beam 1503 through an angular range Δα corresponding to a current pixel 1519 of the image being displayed. In other words, the pulse width of the emitted light pulse is less than a time interval during which the beam scanner 1506 points to a single pixel, such as the current pixel 1519, of the image being displayed. Pixels 1518, including the currently displayed pixel 1519, are shown in FIG. 15 in an arc configuration, to illustrate that the image being generated is in angular domain where each beam angle corresponds to a pixel of the image. The energy of the powering pulses 1505 may be selected in accordance with the current pixel 1519 (or pixels) being displayed at any given moment of time. It is noted that the term "pixel" as used herein refers to an element of an image being displayed, which may or may not be related to a "pixel" as an element of a detector array or an element of a visual display panel comprising an array of light-emitting pixels.

FIGS. 16A and 16B further illustrate the timing and the required energy of the light pulses. A pointing angle curve 1600 of the scanner 1506 (FIG. 15) runs through the angular range Δα of the currently displayed pixel 1519 corresponding to a pixel time interval Δt (FIG. 16A). In some embodiments, the time duration of light pulse is, on average, at least twice shorter than Δt, and may be even shorter, e.g. no greater than one quarter of Δt, one tenth of Δt, one hundredth of Δt, and even less than one thousandth of Δt. As explained above, the shorter light pulses may experience spectral broadening that facilitates the reduction of interference patterns and artifacts, being the pupil multipath interference artifacts or Newton rings type interference artifacts. A shorter pulse may have a proportionally higher peak power, such that the total pulse energy (an integral of power over time) is preserved. For example, an optical energy required to display the current pixel 1519 by providing a constant optical power $P_1$ during the pixel time interval is represented by the geometrical area of a first rectangle 1601. A geometrical area of a second rectangle 1602 represents pulse energy of a light pulse having the same energy but much shorter duration than the pixel time interval Δt. In FIG. 16B, the geometrical areas of the first 1601 and second 1602 rectangles is the same, because they are related to displaying the same current pixel 1519. It is further noted that the principles of operation considered with reference to FIGS. 15 and 16A, 16B are equally applicable to single- and multi-emitter laser sources.

Figure 17:
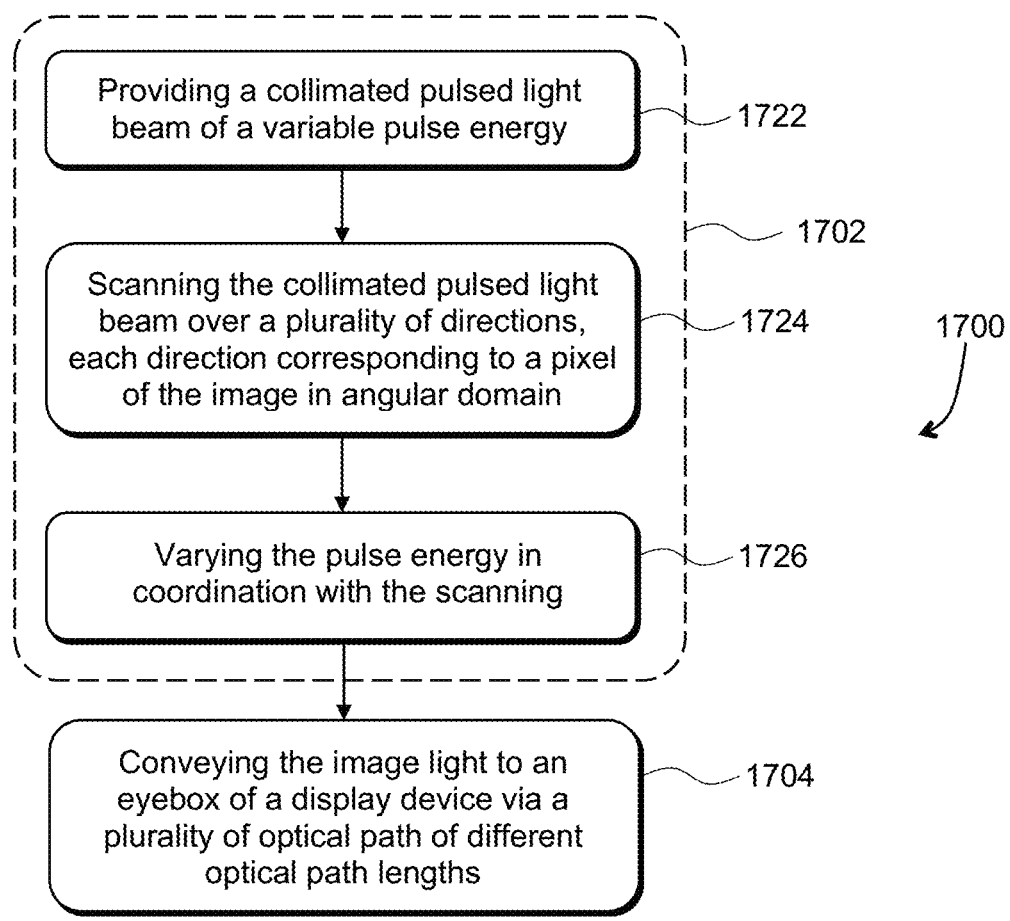
FIG. 17 is a flow chart of a method for displaying an image to a viewer.

Turning to FIG. 17, a method 1700 for displaying an image to a viewer may be performed using any display device or projector disclosed herein, e.g. the display device 100 of FIG. 1. The method 1700 includes using a pulsed laser source, e.g. the laser source 102 (FIG. 1), to obtain (FIG. 17; 1702) image light carrying an image in angular domain. A waveguide, e.g. the waveguide 108 of the display device 100 of FIG. 1, is used to convey (FIG. 17; 1704) the image light to an eyebox of a display device via a plurality of light paths inside the waveguide, the plurality of light paths corresponding to a same pixel of the image being displayed. Different light paths of the plurality of light paths in the waveguide have different optical path lengths. For example, referring back to FIG. 3, the portions 332,333 of the light beam 303 that are in-coupled together into the eye's pupil 316 have different optical path lengths, the difference being one trip of the light beam 303 up and down on the zigzag path within the pupil-replicating waveguide 308. The pulsing of the image light by the laser source results in a spectral broadening of the image light emitted by the laser source, as illustrated in FIGS. 7A and 7B for the example of a longitudinally multimode, transversally singlemode pulsed laser source. The spectral broadening washes out interference-caused image artifacts at the eyebox by lessening optical interference between portions of the image light propagated via different light paths in the waveguide. In some embodiments, a coherence length of the laser source, associated with the spectral broadening due to pulsing of the image light, is less than a difference between optical path lengths of the plurality of light paths. For example, the coherence length may be less than the optical path length up and down on the zigzag path within the pupil-replicating waveguide 308 (FIG. 3). For embodiments where several optical paths lead into the pupil, the coherence length may be less than maximum optical path length difference between the several optical paths.

In some embodiments, providing the image light in step 1702 includes chirping an optical frequency of the laser source when pulsing the image light such that the chirping causes the spectral broadening of the pulsed image light. Providing the image light may also include operating a pulsed laser source at a plurality of longitudinal lasing modes and at substantially one transversal lasing mode, for an additional spectral broadening and associated shortening of the coherence length of the emitted image light.

In scanning projector display embodiments of the method 1700, the step 1702 of providing the image light may include using pulsed laser source to obtain (1722) a collimated pulsed light beam of a variable pulse energy, and using a beam scanner to angularly scan (1724) the collimated pulsed light beam over a plurality of directions, each direction corresponding to a pixel of the image in angular domain. The pulse energy of the collimated pulsed light beam may be varied (1726) in coordination with the scanning of the collimated pulsed light beam by the beam scanner. The pulse energy corresponds to a brightness of the corresponding pixel currently pointed at by the beam scanner. In some embodiments, a pulse duration of the collimated pulsed light beam is, on average, at least two times less than a time interval during which the beam scanner points at a single pixel of the image, e.g. five times less, ten times less, a hundred times, or even a thousand times less than the pixel time interval, for a greater degree of spectral broadening of the laser pulse, e.g. due to chirping of the laser pulse.

In some embodiments of a scanning display device of this disclosure, a controller may be configured to dynamically adjust the emission wavelength of the laser source during the scanning, so as to improve the optical resolution of the display and to lessen artifacts at the eyebox. For example, referring back to FIG. 1, the controller 112 of the display device 100 may be configured to operate the scanner 106 to angularly scan the image light 103; obtain a beam angle of the image light 107; and adjust an emission wavelength of the laser diode source 102 depending on the beam angle to lessen a spot size of a spot representing the pixel of the image to be displayed, e.g. by selecting such a wavelength that all the image light 103 portions propagated via different light paths 109 are in-phase. When all the image light 103 portions are in-phase, a constructive interference at the center of the currently displayed pixel increases the pixel peak height, while reducing the intensity on the sides of the pixel, which effectively narrows down the light spot being displayed and improves the spatial resolution of the display. The wavelength adjustment as a function of the beam angle, or image pixel coordinate, needs to be pre-calibrated. The spot size may be lessened due to coherent superposition of the portions of the image light 103 having propagated through different light paths 109. The proper coherent superposition may be provided by a proper selection of the instantaneous emission wavelength of the laser source 102, depending on the image pixel being currently displayed and optical path length difference(s) associated with the currently displayed pixel.

Figure 18A:
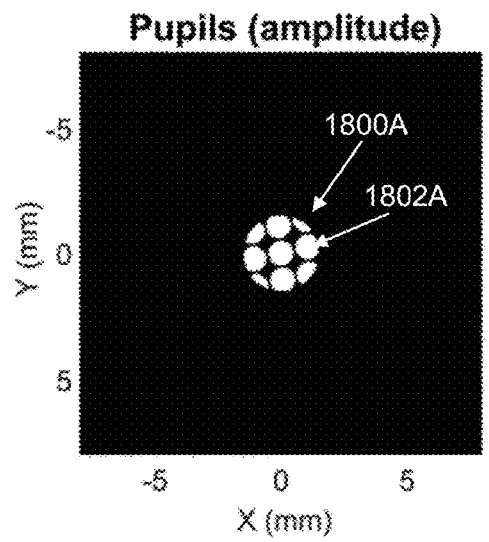
FIGS. 18A, 18B, 18C, and 18D are pupil intensity profile, pupil phase profile, a computed point spread function (PSF), and a computed PSF profile, respectively, of a display device with incoherently superimposed image light portions.
Figure 18B:
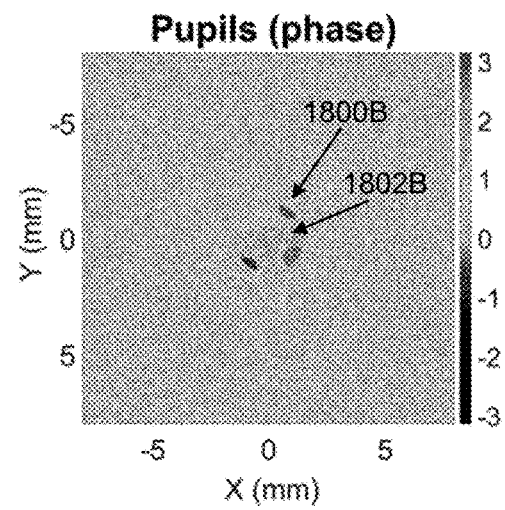
Figure 18C:
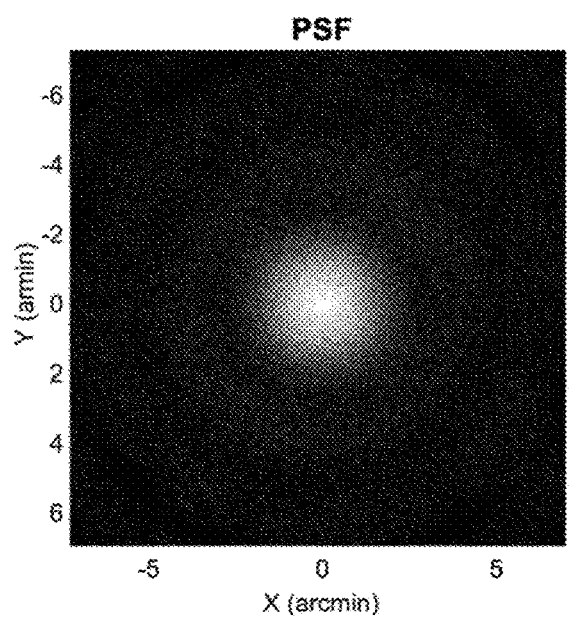
Figure 18D:
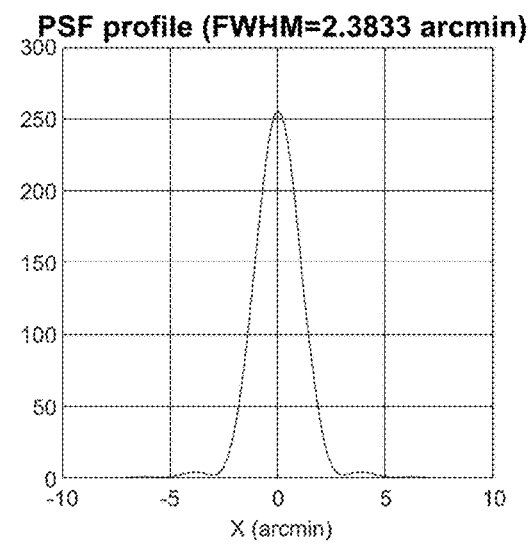

The incoherent superposition of the image light portions will be illustrated first for comparison with coherent superposition considered further below. Referring to FIGS. 18A to 18D with further reference to FIG. 1, an amplitude distribution of the image light 103 at the eyebox 110 (FIG. 1) is presented in FIG. 18A. The beam diameter of the image light 103 sub-portions propagating along different optical paths 109 is about 1 mm in this example. The eye pupil diameter is about 3 mm in this example. The eye pupil is represented by a circle 1800A. The image light 103 sub-portions produce bright round spots 1802A within the circle 1800A. FIG. 18B illustrates a corresponding optical phase distribution, with the eye pupil represented by a circle 1800B and the image light 103 sub-portions represented by spots 1802B within the circle 1800B. Since the phases of the image light 103 sub-portions are randomly distributed, the resulting point spread function (PSF; FIG. 18C) is rather broad: its full width at half maximum (FWHM) is 2.3833 arcmin in this simulation (FIG. 18D).

Figure 19A:
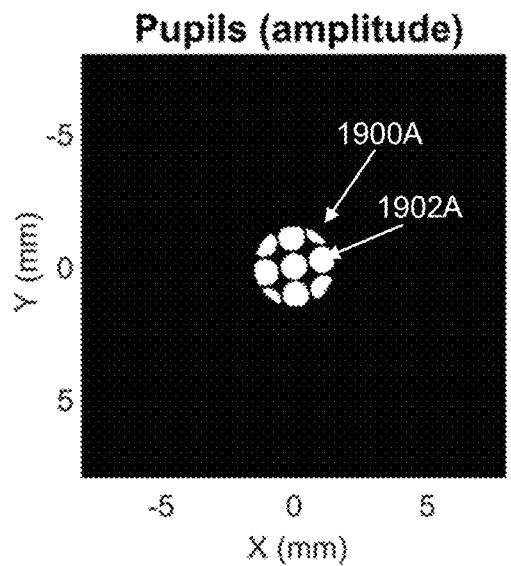
FIGS. 19A, 19B, 19C, and 19D are pupil intensity profile, pupil phase profile, a computed PSF, and a computed PSF profile, respectively, of a display device with coherently superimposed image light portions.
Figure 19B:
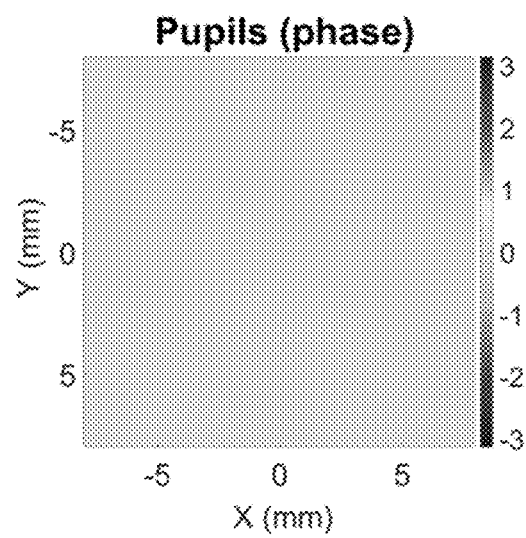
Figure 19C:
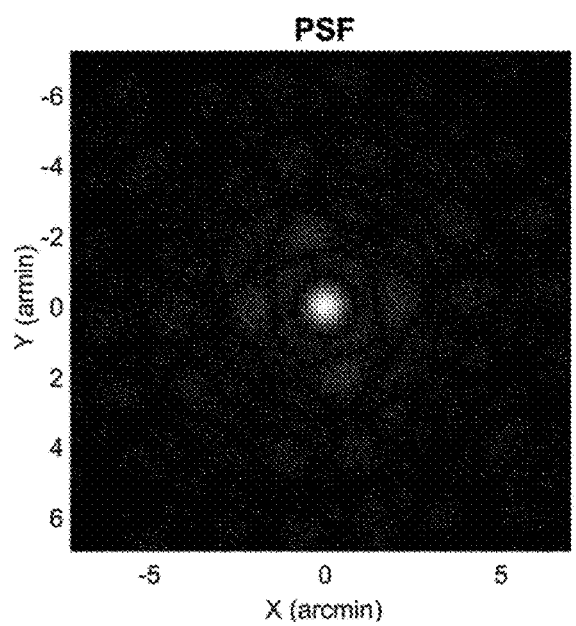
Figure 19D:
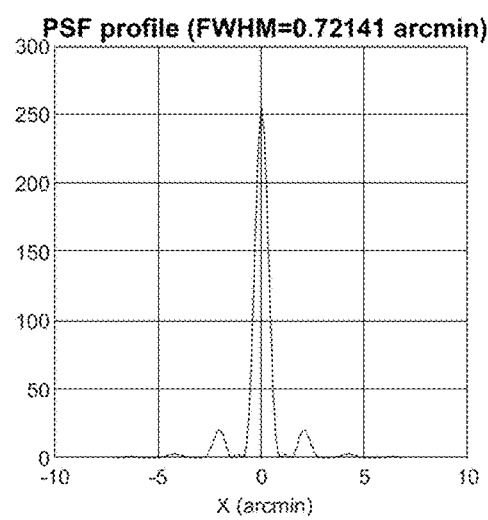

A coherent superposition of the in-phase image light 103 portions is illustrated in FIGS. 19A to 19D. Referring specifically to FIG. 19A, the eye pupil (3 mm in diameter in this example) is represented by a circle 1900A. The image light 103 sub-portions produce bright round spots 1902A (1 mm in diameter in this example) within the circle 1900A. FIG. 19B illustrates a corresponding optical phase distribution. The phase of all the image light 103 sub-portions is the same, and equal to 0 in this example. The resulting PSF is shown in FIG. 19C, and its profile is shown in FIG. 19D. One can see that the coherent addition of the image light 103 sub-portions results in a much narrower computed PSF FWHM envelope of only 0.72141 arcmin. The FWHM is reduced by over three times by selecting a wavelength at which the image light 103 portions are in-phase. This proves that the coherent addition of image light portions propagated along different optical paths may considerably enhance optical resolution of a display device.

Figure 20:
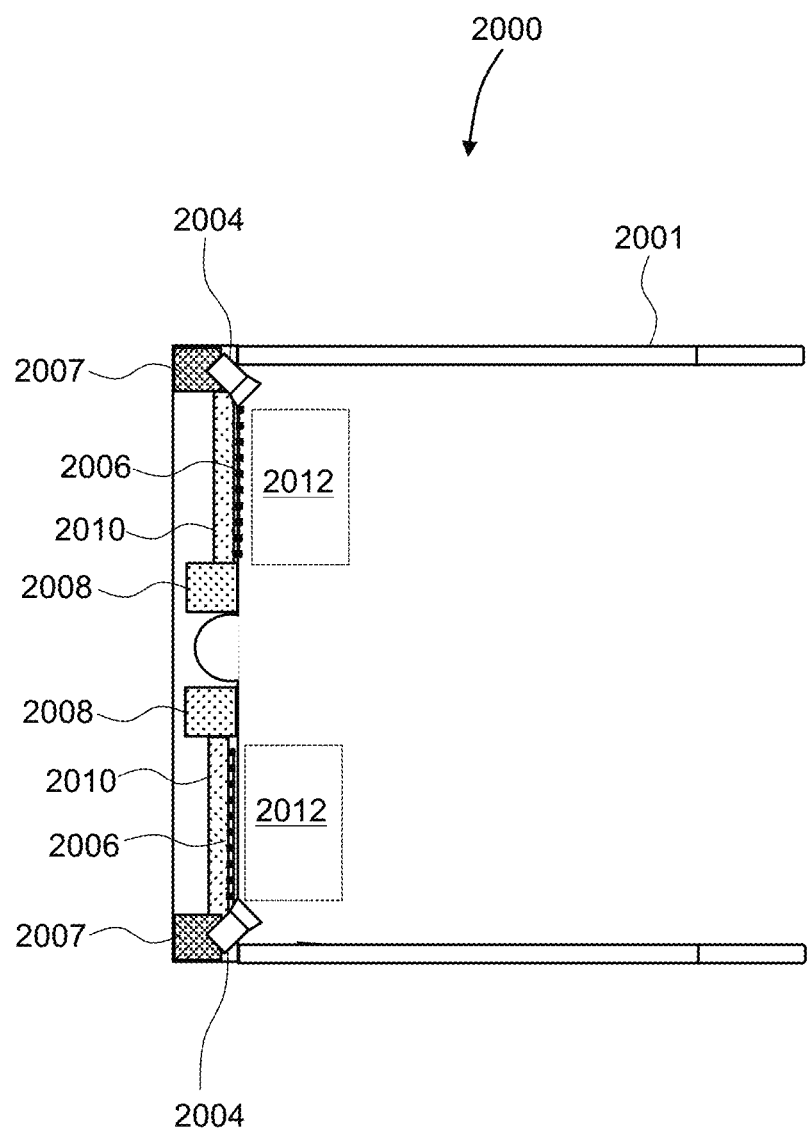
FIG. 20 is a view of an augmented reality (AR) display of this disclosure having a form factor of a pair of eyeglasses.

Turning to FIG. 20, an augmented reality (AR) near-eye display 2000 includes a frame 2001 having a form factor of a pair of eyeglasses. The frame 2001 supports, for each eye: a projector 2008 including a laser light source described herein, a pupil-replicating waveguide 2010 optically coupled to the projector 2008, an eye-tracking camera 2004, a plurality of illuminators 2006, and an eye-tracking camera controller 2007. The projector 2008 may include, for example, the display projector 1400 of FIGS. 14A and 14B. The illuminators 2006 may be supported by the pupil-replicating waveguide 2010 for illuminating an eyebox 2012. The projector 2008 provides a fan of light beams carrying an image in angular domain to be projected into a user's eye. The pupil-replicating waveguide 2010 receives the fan of light beams and provides multiple laterally offset parallel copies of each beam of the fan of light beams, thereby extending the projected image over the eyebox 2012. The coherence length of the laser sight source of the projector 2008 may be less than a difference between optical path lengths of multiple light paths inside the pupil-replicating waveguide 2010. This enables one to lessen or reduce optical interference at the eyebox 2012 between portions of the image light propagated via different light paths.

Multi-emitter laser sources, e.g. ones presented in FIGS. 11, 12, and 13, may be used in the projector 2008. Each emitter of the multi-emitter laser chip may be configured to emit image light at an emission wavelength of a same color channel. The emission wavelengths of different emitters of the same multi-emitter laser chip may occupy a spectral band having the spectral width of the laser source.

In some embodiments, the projector 2008 may include two or more multi-emitter laser chips emitting light at wavelengths of a same color channel or different color channels. In embodiments where the multi-emitter laser chips belong to a same color channel, the emission wavelengths of emitters of different multi-emitter laser chips may be separated by at least a half of a spectral width of one emitter of the multi-chip laser source, for lessening optical interference at the eyebox 1512 between portions of the image light propagated via different light paths. For AR applications, the pupil-replicating waveguide 2010 can be transparent or translucent to enable the user to view the outside world together with the images projected into each eye and superimposed with the outside world view. The images projected into each eye may include objects disposed with a simulated parallax, so as to appear immersed into the real world view.

The purpose of the eye-tracking cameras 2004 is to determine position and/or orientation of both eyes of the user. Once the position and orientation of the user's eyes are known, a gaze convergence distance and direction may be determined. The imagery displayed by the projectors 2008 may be adjusted dynamically to account for the user's gaze, for a better fidelity of immersion of the user into the displayed augmented reality scenery, and/or to provide specific functions of interaction with the augmented reality. In operation, the illuminators 2006 illuminate the eyes at the corresponding eyeboxes 2012, to enable the eye-tracking cameras to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with illuminating light, the latter may be made invisible to the user. For example, infrared light may be used to illuminate the eyeboxes 2012.

The function of the eye-tracking camera controllers 2007 is to process images obtained by the eye-tracking cameras 2004 to determine, in real time, the eye gazing directions of both eyes of the user. In some embodiments, the image processing and eye position/orientation determination functions may be performed by a central controller, not shown, of the AR near-eye display 2000. The central controller may also provide control signals to the projectors 2008 to generate the images to be displayed to the user, depending on the determined eye positions, eye orientations, gaze directions, eyes vergence, etc.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 21:
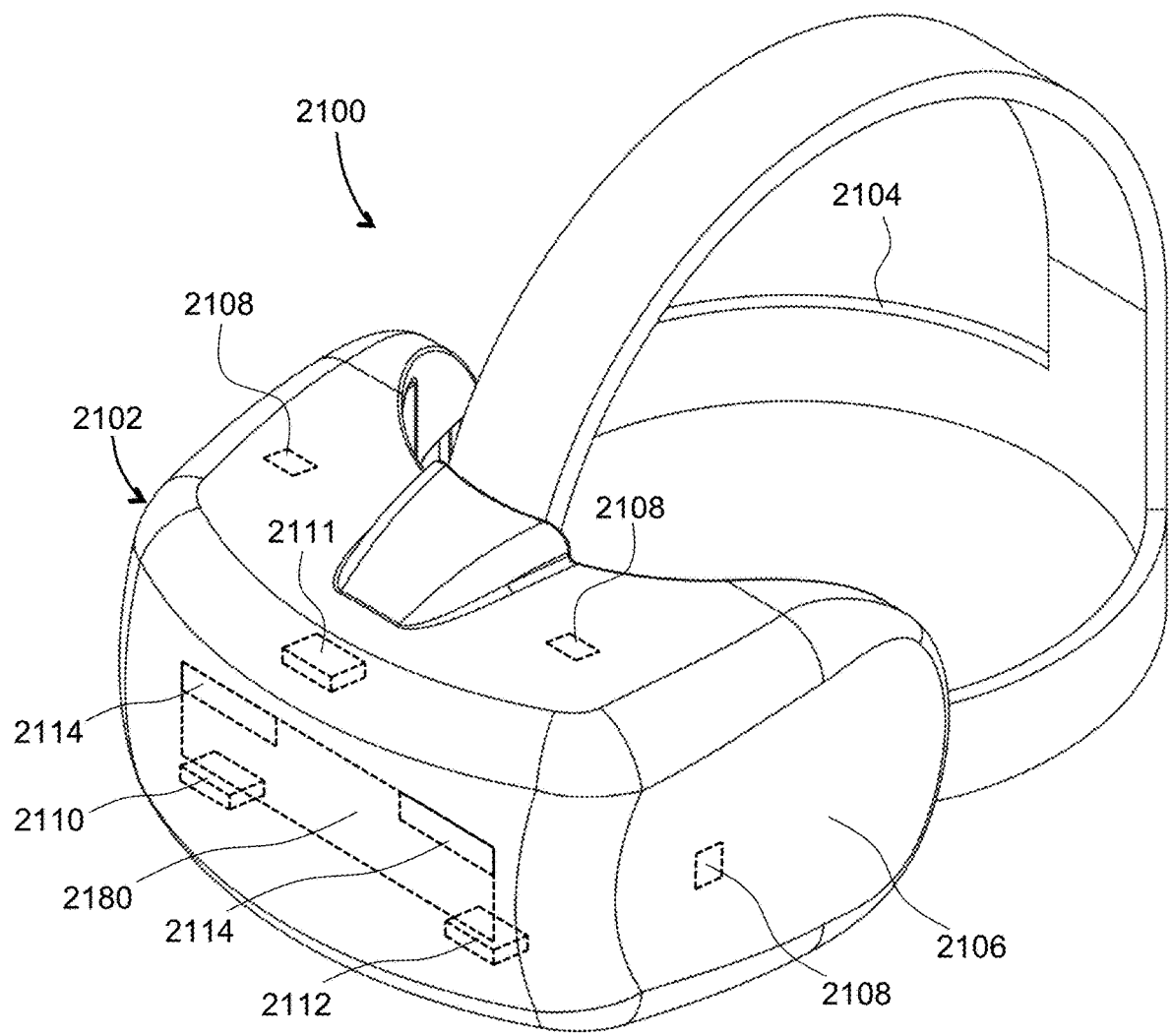
FIG. 21 is an isometric view of a head-mounted display of this disclosure.

Referring to FIG. 21, an HMD 2100 is an example of an AR/VR wearable display system which encloses the user's face, for a greater degree of immersion into the AR/VR environment. The HMD 2100 is a variant of the display devices described herein, including without limitation the display device 100 of FIG. 1, the near-eye scanning display device 200 of FIG. 2, the near-eye display 300 of FIG. 3, and the AR near-eye display 2000 of FIG. 20, and may include any elements described therein. The function of the HMD 2100 is to augment views of a physical, real-world environment with computer-generated imagery, and/or to generate an entirely virtual 3D imagery.

The HMD 2100 may include a front body 2102 and a band 2104. The front body 2102 is configured for placement in front of eyes of a user in a reliable and comfortable manner, and the band 2104 may be stretched to secure the front body 2102 on the user's head. A display system 2180 may be disposed in the front body 2102 for presenting AR/VR imagery to the user. Sides 2106 of the front body 2102 may be opaque or transparent.

In some embodiments, the front body 2102 includes locators 2108 and an inertial measurement unit (IMU) 2110 for tracking acceleration of the HMD 2100, and position sensors 2112 for tracking position of the HMD 2100. The IMU 2110 is an electronic device that generates data indicating a position of the HMD 2100 based on measurement signals received from one or more of position sensors 2112, which generate one or more measurement signals in response to motion of the HMD 2100. Examples of position sensors 2112 include: one or more accelerometers, one or more gyroscopes, one or more magnetometers, another suitable type of sensor that detects motion, a type of sensor used for error correction of the IMU 2110, or some combination thereof. The position sensors 2112 may be located external to the IMU 2110, internal to the IMU 2110, or some combination thereof.

The locators 2108 are traced by an external imaging device of a virtual reality system, such that the virtual reality system can track the location and orientation of the entire HMD 2100. Information generated by the IMU 2110 and the position sensors 2112 may be compared with the position and orientation obtained by tracking the locators 2108, for improved tracking accuracy of position and orientation of the HMD 2100. Accurate position and orientation is important for presenting appropriate virtual scenery to the user as the latter moves and turns in 3D space.

The HMD 2100 may further include a depth camera assembly (DCA) 2111, which captures data describing depth information of a local area surrounding some or all of the HMD 2100. The depth information may be compared with the information from the IMU 2110, for better accuracy of determination of position and orientation of the HMD 2100 in 3D space.

The HMD 2100 may further include an eye tracking system 2114 for determining orientation and position of user's eyes in real time. The obtained position and orientation of the eyes also allows the HMD 2100 to determine the gaze direction of the user and to adjust the image generated by the display system 2180 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 2102.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function. The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A display device for displaying an image to a viewer, the display device comprising:
   a pulsed laser source for providing image light carrying the image in angular domain; and
   a waveguide for conveying the image light to an eyebox of the display device, wherein the waveguide is configured to provide a plurality of light paths for the image light to the eyebox, different light paths of the plurality of light paths corresponding to a same pixel of the image and having different optical path lengths;
   wherein the image light has spectral broadening due to pulsing of the image light, the spectral broadening lessening optical interference at the eyebox between portions of the image light propagated via different light paths of the plurality of light paths.

2. The display device of claim 1, wherein the pulsed laser source has a coherence length associated with the spectral broadening due to pulsing of the image light, wherein the coherence length is substantially equal to or less than a difference between optical path lengths of the plurality of light paths.

3. The display device of claim 1, wherein the pulsed laser source has an optical frequency chirp due to pulsing of the image light, the optical frequency chirp causing the spectral broadening.

4. The display device of claim 1, wherein the pulsed laser source comprises a plurality of longitudinal lasing modes and substantially one transversal lasing mode.

5. The display device of claim 1, further comprising a pulsed laser driver for providing electrical driving pulses to the pulsed laser source.

6. The display device of claim 5, wherein the pulsed laser driver is configured to provide short enough pulses for the pulsed laser source to provide the image light in form of pulses shorter than 5 ns in duration.

7. The display device of claim 5, wherein the pulsed laser driver is configured to provide short enough pulses for the pulsed laser source to provide the image light in form of pulses shorter than 1 ns in duration.

8. The display device of claim 1, further comprising:
   a beam scanner optically coupled to the pulsed laser source, wherein the pulsed laser source is configured to provide a collimated pulsed light beam of a variable pulse energy, and wherein the beam scanner is configured to angularly scan the collimated pulsed light beam, thereby providing the image in angular domain; and
   a controller operably coupled to the pulsed laser source and the beam scanner, for causing the beam scanner to scan the collimated pulsed light beam over a plurality of directions, each direction of the plurality of directions corresponding to a pixel of the image in angular domain, and to vary the pulse energy of the collimated pulsed light beam in coordination with the scanning, such that the pulse energy corresponds to a brightness of the corresponding pixel currently pointed at by the beam scanner.

9. The display device of claim 8, wherein a pulse duration of the collimated pulsed light beam is at least four times less than a time interval during which the beam scanner points at a corresponding pixel of the image.

10. The display device of claim 1, wherein the waveguide comprises a pupil-replicating waveguide, and wherein the beam scanner comprises a MEMS scanner.

11. A method for displaying an image to a viewer, the method comprising:
   using a pulsed laser source to provide image light carrying the image in angular domain; and
   using a waveguide to convey the image light to an eyebox of a display device, the waveguide having a plurality of light paths for the image light to propagate in the waveguide to the eyebox, different light paths of the plurality of light paths having different optical path lengths;
   wherein the image light has spectral broadening due to pulsing of the image light, the spectral broadening lessening optical interference at the eyebox between portions of the image light propagated via different light paths of the plurality of light paths.

12. The method of claim 11, wherein the pulsed laser source has a coherence length associated with the spectral broadening due to pulsing of the image light, wherein the coherence length is less than a difference between optical path lengths of the plurality of light paths.

13. The method of claim 11, wherein providing the image light comprises chirping an optical frequency of the pulsed laser source when pulsing the image light, the chirping causing the spectral broadening of the image light.

14. The method of claim 11, wherein providing the image light comprises operating the pulsed laser source at a plurality of longitudinal lasing modes and at substantially one transversal lasing mode.

15. The method of claim 11, wherein the pulsed laser source is configured to provide a collimated pulsed light beam of a variable pulse energy, the method further comprising:
   causing a beam scanner to scan the collimated pulsed light beam over a plurality of directions, each direction of the plurality of directions corresponding to a pixel of the image in angular domain; and
   varying the pulse energy of the collimated pulsed light beam in coordination with the scanning, such that the pulse energy corresponds to a brightness of the corresponding pixel currently pointed at by the beam scanner.

16. The method of claim 15, wherein a pulse duration of the collimated pulsed light beam is at least four times less than a time interval during which the beam scanner points at a corresponding pixel of the image.

17. A display device for displaying an image to a viewer, the display device comprising:
   a laser source for providing image light carrying the image in angular domain, the laser source having a spectral width and a coherence length associated therewith; and
   a waveguide for conveying the image light provided by the laser source to an eyebox of the display device, wherein the waveguide is configured to provide a plurality of light paths for the image light to the eyebox, different light paths of the plurality of light paths corresponding to a same pixel of the image and having different optical path lengths;
   wherein the coherence length is less than a difference between optical path lengths of the plurality of light paths, whereby optical interference at the eyebox between portions of the image light propagated via different light paths of the plurality of light paths is lessened.

18. The display device of claim 17, wherein the laser source comprises a plurality of longitudinal lasing modes occupying a spectral band having the spectral width of the laser source.

19. The display device of claim 17, wherein the laser source comprises a multi-emitter laser chip, wherein each emitter of the multi-emitter laser chip is configured to emit image light at an emission wavelength of a first color channel;
   wherein the emission wavelengths of different emitters of the multi-emitter laser chip occupy a spectral band having the spectral width of the laser source.

20. The display device of claim 17, wherein the laser source comprises first and second multi-emitter laser chips, wherein each emitter of the first and second multi-emitter laser chips is configured to emit image light at an emission wavelength of a first color channel;
   wherein the emission wavelength of emitters of the first multi-emitter laser chip is separated by the emission wavelength of emitters of the second multi-emitter laser chip by at least a half of the spectral width of the first or second multi-emitter laser chips, for lessening optical interference at the eyebox between portions of the image light propagated via different light paths of the plurality of light paths.

* * * * *